(12) United States Patent
Adachi

(10) Patent No.: US 6,876,611 B1
(45) Date of Patent: Apr. 5, 2005

(54) OPTICAL RECORDING METHOD AND OPTICAL RECORDING DEVICE

(75) Inventor: Yoshihisa Adachi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 784 days.

(21) Appl. No.: 09/712,765

(22) Filed: Nov. 14, 2000

(30) Foreign Application Priority Data

Nov. 15, 1999 (JP) ............................................ 11-323596
Oct. 3, 2000 (JP) ...................................... 2000-303158

(51) Int. Cl.$^7$ ................................................ G11B 7/00
(52) U.S. Cl. ................................................. 369/47.53
(58) Field of Search ............................. 369/13.27, 116, 369/13.39, 47.51, 53.34, 53.26, 47.53

(56) References Cited

U.S. PATENT DOCUMENTS

| | | | | |
|---|---|---|---|---|
| 5,226,027 A | * | 7/1993 | Bakx ........................ | 369/47.55 |
| 5,677,802 A | * | 10/1997 | Saiki et al. .................... | 360/51 |
| 6,067,284 A | * | 5/2000 | Ikeda et al. .................. | 369/116 |
| 6,125,085 A | * | 9/2000 | Fuji et al. .................. | 369/13.27 |
| 6,243,339 B1 | * | 6/2001 | Spruit et al. ............. | 369/53.13 |
| 6,359,846 B1 | * | 3/2002 | Shoji et al. ................ | 369/47.5 |

FOREIGN PATENT DOCUMENTS

| JP | 04-141827 | 5/1992 |
|---|---|---|
| JP | 10-69639 | 3/1998 |
| JP | 10-069639 | 3/1998 |
| JP | 10-124953 | 5/1998 |
| JP | 10-154331 | 6/1998 |
| JP | 11-16251 | 1/1999 |
| JP | 11-073700 | 3/1999 |

* cited by examiner

*Primary Examiner*—Thang V. Tran
*Assistant Examiner*—Bach Vuong
(74) *Attorney, Agent, or Firm*—Edwards & Angell, LLP; David G. Conlin; George W. Hartnell, III

(57) ABSTRACT

A reverse pattern is formed in a track adjacent to a specified track on an optical recording medium with a predetermined light beam capable of writing large recording marks. Thereafter, a normal pattern is formed in an area, of an adjacent track, which is adjacent to the reverse pattern in the specified track with recording light beams of various strengths, the adjacent track being adjacent to the specified track. The specified track is read to detect a plurality of re-out signals according to individual light beam conditions. The adjacent track is read to detect a plurality of read-out signals according to individual light beam conditions. An optimum recording condition is determined for the specified track from the plurality of light beam condition and the read-out signals from the specified track and the adjacent track, and information is recorded in the specified track according to the optimum recording condition. Thus, even when there exists a difference in recording sensitivity between adjacent tracks, since the width of the recording marks can be controlled to be optimum, cross-talk between tracks during signal reproduction and cross-erase during signal recording are restrained to minimum levels, and recording density is improved.

12 Claims, 19 Drawing Sheets

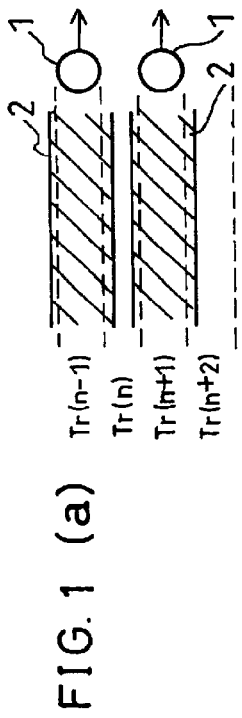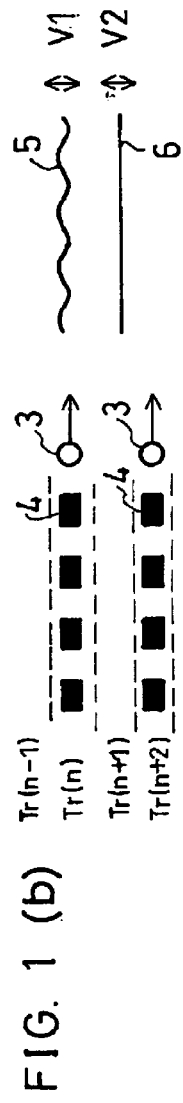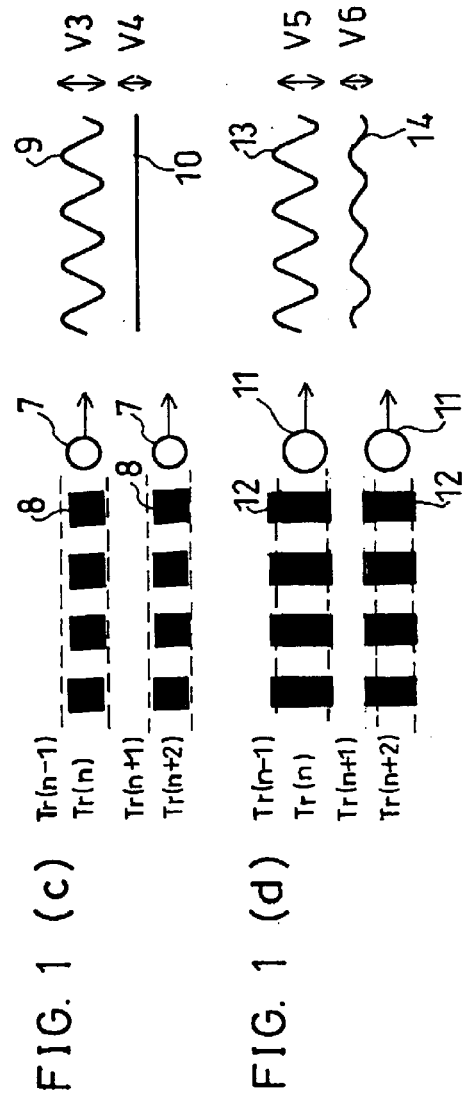
FIG. 1 (a)
FIG. 1 (b)
FIG. 1 (c)
FIG. 1 (d)

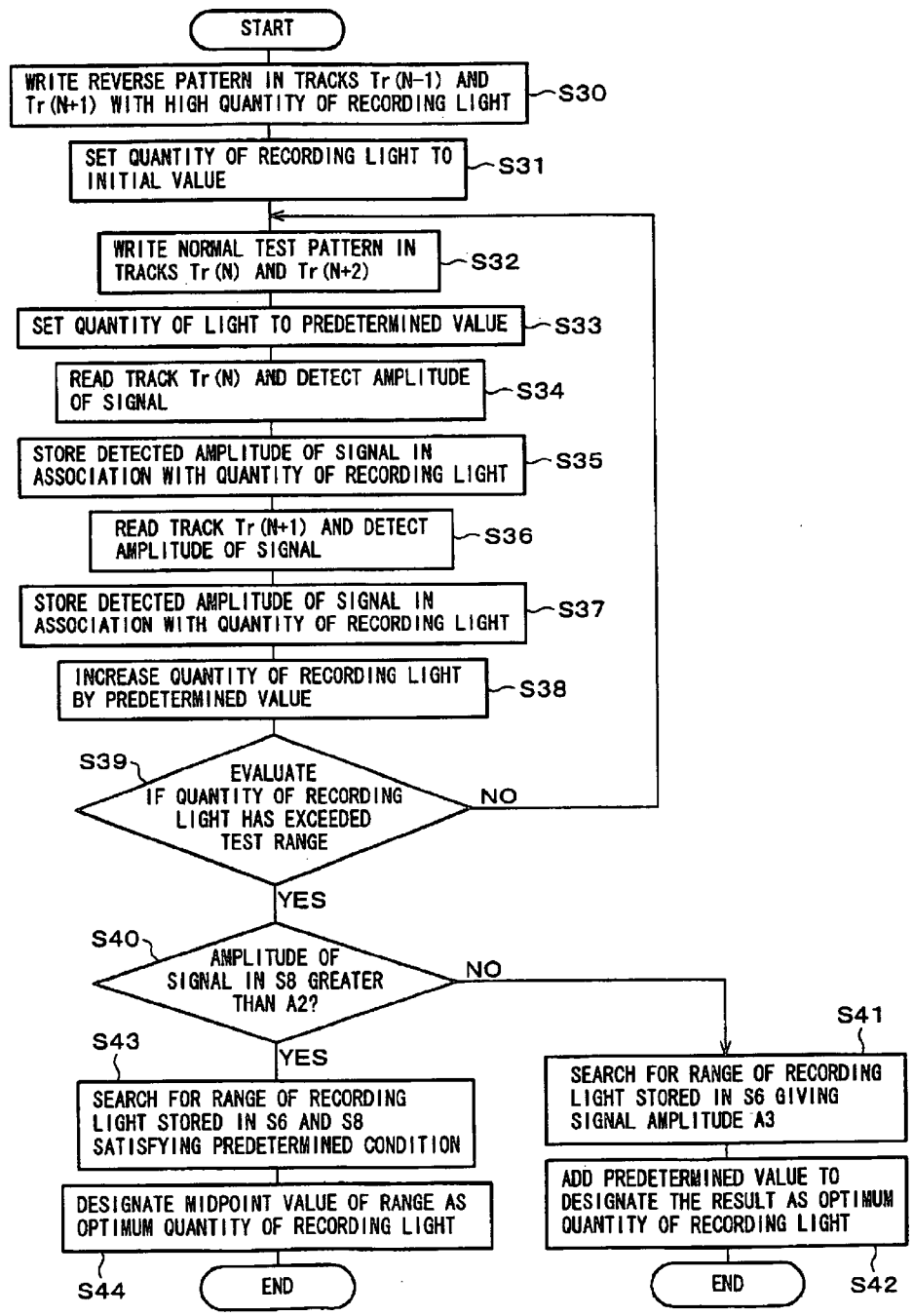

OPTICAL RECORDING METHOD AND OPTICAL RECORDING DEVICE

FIELD OF THE INVENTION

The present invention relates to optical recording methods and optical recording devices to record information on optical recording media, in particular, to optical recording methods and optical recording devices capable of optimizing a recording condition.

BACKGROUND OF THE INVENTION

In recent years, researches have been conducted with increasing vigor to achieve an improved level of high density recording with optical disks. One of obstacles in doing so is that when a recording condition, such as the quantity of a recording light beam projected on the optical disk or the strength of a recording magnetic field externally applied on the magneto-optical disk, changes, the resultant recording marks vary in width (a size measured perpendicular to the track), which obstructs uniform recording and makes it difficult to effect high density recording.

A solution to this problem is disclosed in Japanese Laid-Open Patent Application No. 11-73700/1999 (Tokukaihei 11-73700; published on Mar. 16, 1999; corresponding to, U.S. Pat. No. 6,125,085) whereby the quantity of recording light and the strength of a recording magnetic field are controlled. According to this method, a first test pattern is recorded in a specified track (a track where the recording power is to be optimized), before a second test pattern is recorded in an adjacent track using the same quantity of recording light or the same strength of a recording magnetic field as in the recording of the first test pattern. The first pattern recorded in the specified track is then reproduced. The reproduction signal has an amplitude level reflecting cross-talk during reproduction and cross-erase from adjacent tracks. Therefore, an optimum quantity of recording light or strength of a recording magnetic field can be specified based on the amplitude level of the reproduction signal.

Japanese Laid-Open Patent Application No. 10-69639/1998 (Tokukaihei 10-69639; published on Mar. 10, 1998) discloses a method of recording information in both the land and the groove. According to the disclosure, information is erased in a predetermined track and its adjacent tracks on an optical recording medium. Then, predetermined information is recorded in these adjacent tracks with various recording powers. Subsequently, information in the predetermined track is reproduced to detect the levels of reproduction signals. The levels of reproduction signals are matched to respective recording powers. The recording power at which the level of the reproduction signal shows a sharp increase is designated as the optimum recording power for the predetermined track.

Japanese Laid-Open Patent Application No. 10-69639/1998 describes in its fifth embodiment, paragraphs [0071] to [0073], how to find out the optimum recording power in both the land and the groove. For example, to obtain a recording power for the land, a signal is recorded in the groove followed by replay of the land to find out a recording power at which the levels of the reproduction signal shows a sharp increase and designate that recording power as the optimum recording power for the land.

However, according to the method disclosed in Japanese Laid-Open Patent Application No. 11-73700/1999 mentioned above, to find the optimum quantity of recording light and strength of a recording magnetic field for the specified track, cross-talk is used which occurs during reproduction in the specified track (the track where the recording power is to be optimized). This shows how the specified track is affected by the recording in the adjacent tracks, not how the adjacent tracks are affected by the recording in the specified track.

Therefore, if recording sensitivity differs between the specified track and its adjacent tracks, the method fails and it becomes impossible to optimize the quantity of recording light and strength of a recording magnetic field.

The same problem exists in the method disclosed in Japanese Laid-Open Patent Application No. 10-69639/1998: it is detected through reproduction in the specified track how the specified track (the track where the recording power is to be optimized) is affected by the recording in the adjacent tracks, and the results will be used to obtain an optimum recording power for the specified track. Accordingly, if recording sensitivity differs between the specified track and its adjacent tracks, the method fails and it becomes impossible to optimize the quantity of recording light and strength of a recording magnetic field.

SUMMARY OF THE INVENTION

The present invention addresses the aforementioned problem and has an objective to offer an optical recording method and device which, even if recording sensitivity differs between adjacent tracks, is capable of controlling the width of the recording mark to be optimum, minimizing cross-talk between tracks during reproduction of a signal and cross-erase during recording of a signal (a phenomenon in which an edge of a recording mark is erased by the recording light that spills over from an adjacent track), and achieving an improved level of high density track recording.

To accomplish the above objective, a first optical recording method in accordance with the present invention is an optical recording method of recording information on an optical recording medium and is characterized in that the method includes the steps of:

(a) recording a first test pattern in a first track on the optical recording medium under such a predetermined recording condition to form a wider recording mark than the first track;

(b) after the recording of the first test pattern, recording a second test pattern in an area, of a second track, which is adjacent to a recording area of the first test pattern under a plurality of recording conditions, the second track being adjacent to the first track;

(c) reading the first track to detect a first read-out signal according to each of the plurality of recording conditions;

(d) reading the second track to detect a second read-out signal according to each of the plurality of recording conditions;

(e) determining an optimum recording condition for the second track from the plurality of recording conditions and the first and second read-out signals; and (f) recording information in the second track under the optimum recording condition.

To accomplish the above objective, a first optical recording device in accordance with the present invention is an optical recording device for recording information on an optical recording medium by at least projecting a light beam thereon and is characterized in that the device includes:

recording means for recording a first test pattern in a first track on the optical recording medium under such a predetermined recording condition to form a wider recording mark than the first track in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the first track to detect a first read-out signal according to each of the plurality of recording conditions and also for reading the second track to detect a second read-out signal according to each of the plurality of recording conditions; and optimum recording condition determining means for determining an optimum recording condition for the second track from the plurality of recording conditions and the first and second read-out signals.

With this first optical recording method and device, prior to recording information in the second track, a first test pattern is recorded in a first track under such a predetermined recording condition to form a wider recording mark than the first track, then a second test pattern is recorded in a second track under a plurality of recording conditions, and an optimum recording condition is determined for the second track based on the plurality of conditions, the second read-out signal detected from the second track, and the first read-out signal detected from the first track.

Thus, a condition to produce a sufficient reproduction signal becomes obtainable from the second read-out signal detected from the second track, and a condition to prevent cross-erase becomes obtainable from the first read-out signal detected from the first track. An optimum recording condition satisfying these conditions is determined for the second track. Thus, even when there occurs a difference in recording sensitivity between the first and second tracks, the recording condition for the second track can be suitably determined. Therefore, cross-talk between tracks during signal reproduction and cross-erase during signal recording are restrained to minimum levels, and recording density is improved.

A second optical recording method in accordance with the present invention is an optical recording method of recording information on an optical recording medium and is characterized in that the method includes the steps of:

(a) recording a first test pattern in a first track on the optical recording medium under such a predetermined recording condition to form a wider recording mark than the first track;

(b) after the recording of the first test pattern, recording a second test pattern in an area, of a second track, which is adjacent to a recording area of the first test pattern under a plurality of recording conditions, the second track being adjacent to the first track;

(c) reading the second track to detect a second read-out signal according to each of the plurality of recording conditions;

(d) obtaining a second recording condition under which the second read-out signal attains a predetermined state and performing a calculation on the second recording condition, so as to obtain a recording condition under which a wider recording mark is formed than under the second recording condition and designate this recording condition as an optimum recording condition; and (e) recording information in the second track under the optimum recording condition.

A second optical recording device in accordance with the present invention is an optical recording device for recording information on an optical recording medium by at least projecting a light beam thereon, and is characterized in that the device includes:

recording means for recording a first test pattern in a first track on the optical recording medium under such a predetermined recording condition to form a wider recording mark than the first track in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the second track to detect a second read-out signal according to each of the plurality of recording conditions; and optimum recording condition determining means for obtaining a second recording condition under which the second read-out signal attains a predetermined state and performing a calculation on the second recording condition, so as to obtain a recording condition under which a wider recording mark is formed than under the second recording condition and designate this recording condition as an optimum recording condition.

With this second optical recording method and device, prior to recording information in the second track, a first test pattern is recorded in a first track under such a predetermined recording condition to form a wider recording mark than the first track, then a second test pattern is recorded in a second track under a plurality of recording conditions, and a recording condition under which wider recording marks are formed than under the second recording condition is obtained by performing a calculation on the second recording condition under which the second read-out signal detected from the second track attains a predetermined state. This recording condition is then designated as an optimum recording condition for the second track. Thus, a recording condition under which a sufficient reproduction signal is obtained from the second track can be designated as an optimum recording condition for the second track.

A third optical recording method in accordance with the present invention is an optical recording method of recording information on an optical recording medium and is characterized in that the method includes the steps of:

(a) recording a first test pattern in a first track on the optical recording medium under such a predetermined recording condition to form a wider recording mark than the first track;

(b) after the recording of the first test pattern, recording a second test pattern in an area, of a second track, which is adjacent to a recording area of the first test pattern under a plurality of recording conditions, the second track being adjacent to the first track;

(c) reading the first track to detect a first read-out signal according to each of the plurality of recording conditions;

(d) obtaining a first recording condition under which the first read-out signal attains a predetermined state and performing a calculation on the first recording condition, so as to obtain a recording condition under which a narrower recording mark is formed than under the first recording condition and designate this recording condition as an optimum recording condition; and (e) recording information in the second track under the optimum recording condition.

A third optical recording device in accordance with the present invention is an optical recording device for recording information on an optical recording medium by at least projecting a light beam thereon and is characterized in that the device includes:

recording means for recording a first test pattern in a first track on the optical recording medium under such a predetermined recording condition to form a wider recording mark than the first track in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the first track to detect a first read-out signal according to each of the plurality of recording conditions; and optimum recording condition determining means for obtaining a first recording condition under which the first read-out signal attains a predetermined state and performing a calculation on the first recording condition, so as to obtain a recording condition under which a narrower recording mark is formed than under the first recording condition and designate this recording condition as an optimum recording condition.

With this third optical recording method and device, prior to recording information in the second track, a first test pattern is recorded in a first track under such a predetermined recording condition to form a wider recording mark than the first track, then a second test pattern is recorded in a second track under a plurality of recording conditions, and a recording condition under which narrower recording marks are formed than under the first recording condition is obtained by performing a calculation on the first recording condition under which the first read-out signal detected from the first track attains a predetermined state. This recording condition is then designated as an optimum recording condition for the second track. Thus, a recording condition under which the second track produces no cross-talk on the first track can be designated as an optimum recording condition for the second track.

For a fuller understanding of the nature and advantages of the invention, reference should be made to the ensuing detailed description taken in conjunction with the accompanying drawings.

BRIEF DESCRIPTION OF THE DRAWINGS

FIG. 1(*a*) to FIG. 1(*d*) are diagrams illustrating a method to control a recording condition in accordance with embodiment 1:

FIG. 10(*b*) and FIG. 10(*c*) are waveform diagrams illustrating an operation of the clock deriving circuit shown in FIG. 10(*a*).

FIG. 11 is a flow chart showing a method to control a recording condition in accordance with embodiment 3.

DESCRIPTION OF THE EMBODIMENTS

Embodiment 1

Figure 2:
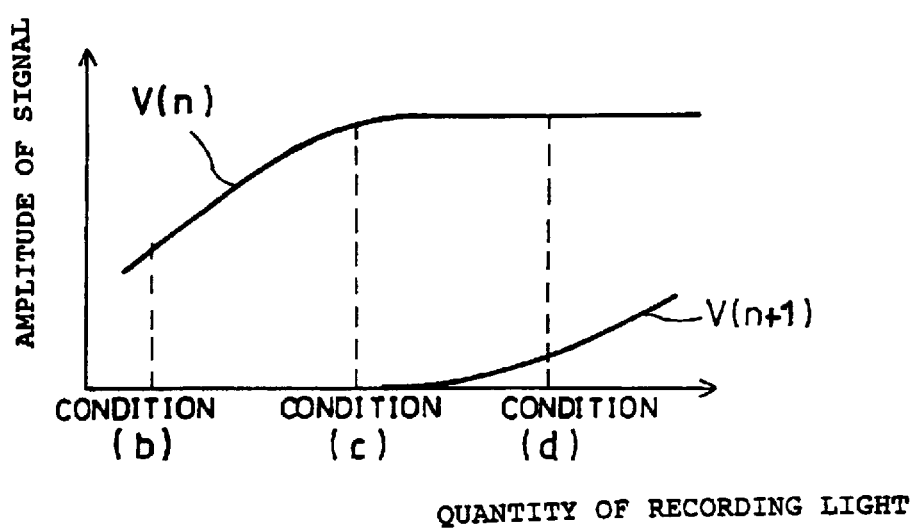
FIG. 2 is a graph showing the amplitudes of readout signals from tracks Tr(n) and Tr(n+1) in accordance with embodiment 1.
Figure 3:
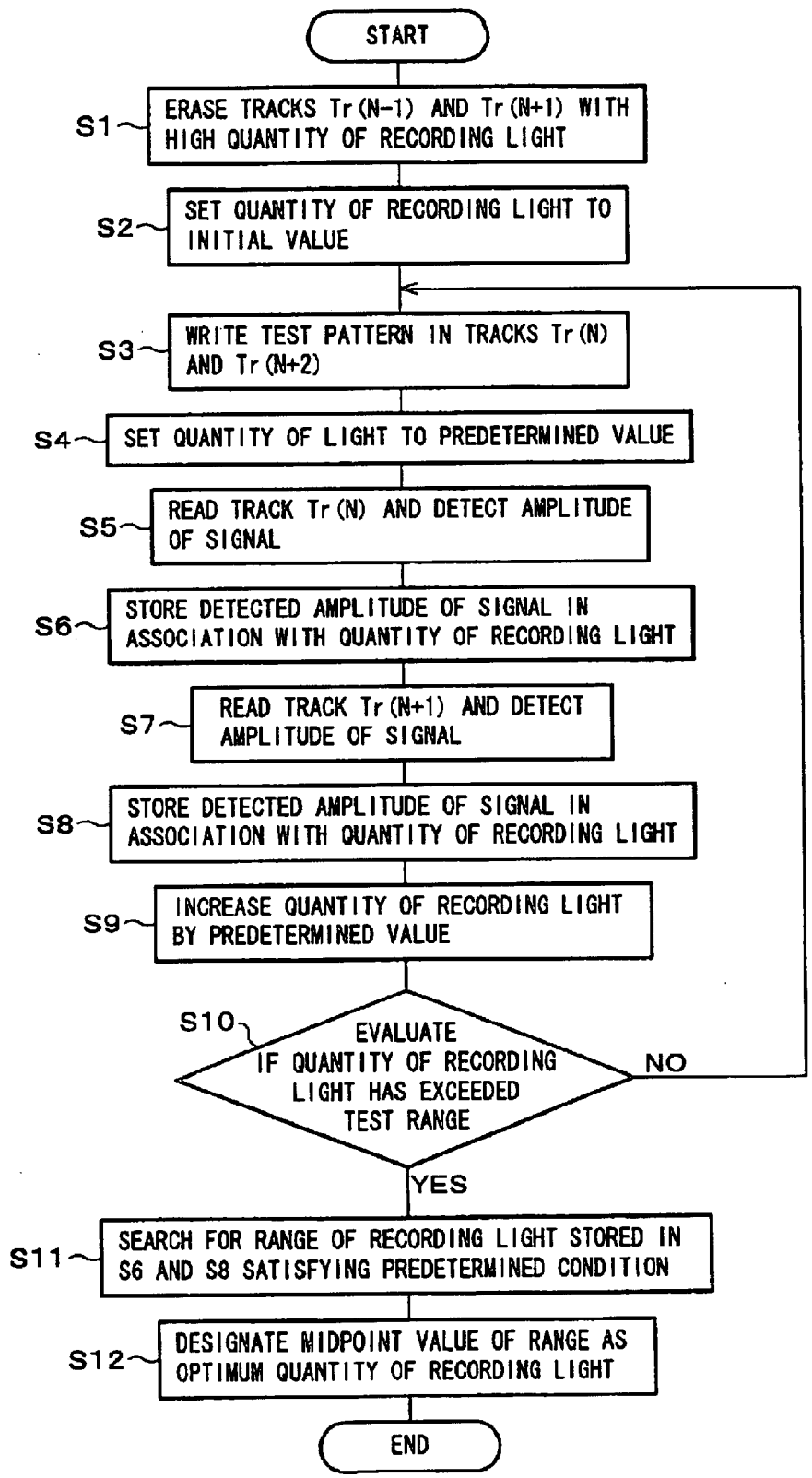
FIG. 3 is a flow chart showing a method to control a recording condition in accordance with embodiment 1.

Taking magneto-optical recording methods and devices as examples, the following description will discuss an embodiment of the present invention in reference to FIG. 1(*a*) to FIG. 1(*d*), FIG. 2, and FIG. 3.

Here, magneto-optical recording is effected through modulation of a magnetic field. There are various recording conditions that should be optimized in magnetic-field-modulated recording: namely, the quantity of recording light (the quantity of a light beam projected on the optical recording medium during recording), the strength of a recording magnetic field (the strength of a magnetic field applied to the optical recording medium during recording), etc. Among them, we will focus for convenience in description on the quantity of recording light As to optimization of the strength of a recording magnetic field, a similar description applies, so a brief explanation will be given at the end. Accordingly, hereinafter, the strength of a recording magnetic field is assumed to be constant, and the quantity of recording light is varied to find out an optimum quantity of recording light.

In the present invention, the width of a recording mark in a specified track and the quantity of a read-out signal (reproduction signal) from an adjacent track show the spill-over effects produced by the recording mark on the adjacent track. The width of a recording mark in a specified track is optimized based on the detected width of a recording mark and the detected quantity of the read-out signal. From the optimum width, we can obtain an optimum quantity of recording light by which information will be recorded in the specified track. Ideally, the quantity of recording light is optimized every time information is to be recorded. In actual use, however, the optimization may be effected only when a recording medium is inserted in the device.

Following the optimization of the quantity of recording light, recording is effected according to a conventional, well-known technique. In the description below, we therefore will focus on methods and devices to optimize the quantity of light, which forms the core feature of the present invention.

Further, although we will discuss in the following description the optimization of the quantity of recording light for a track Tr(n) among a plurality of tracks Tr on the magneto-optical recording medium, the same description of course applies to every one of the other tracks too. Ideally, the quantity of recording light is optimized at least once for each track. In actual use where information is recorded both in the lands and the grooves, however, if the quantity of recording light is optimized at least once for one of the lands and one of the grooves, the optimization does not have to be effected on the other tracks. The operation may be effected on every group of tracks, for example.

Now, the optimization of the quantity of recording light, which forms the core feature of the present embodiment, will be discussed in terms of its principles.

First Step

As illustrated in FIG. 1(a), a light beam 1 is projected to erase tracks Tr(n−1) and Tr(n+1) which are adjacent to a track Tr(n) as a second track on which the optimization of the quantity of light is to be effected. The quantity of the light beam 1 is set to a relatively high value to erase data in an erasure area 2 of which the width is greater than the track width. Here, we define the term, "to erase tracks Tr(n−1) and Tr(n+1)", as encompassing recording of an erasing pattern, as a first test pattern, in the tracks Tr(n−1) and Tr(n+1).

In FIG. 1(a) to FIG. 1(d), in the case of recording in both the land and the groove which is a well-known high density recording method, the tracks Tr(n) and Tr(n+2) refer to grooves, and the tracks Tr(n−1) and Tr(n+1) refer to lands, for example.

Second Step

Next, as illustrated in FIG. 1(b), recording marks 4 are written to form a predetermined pattern in the tracks Tr(n) and Tr(n+2) using a certain quantity of a light beam 3 (here, a relatively small quantity of light), while applying a recording magnetic field of which the polarity is being reversed. The recording marks 4 have smaller widths (size measured perpendicular to the track) than the track width.

Third Step

Subsequently, the track Tr(n) as a first track is replayed to detect a read-out signal (second read-out signal) 5. Here, the amplitude of the read-out signal 5 is detected. In FIG. 1(b), the recording marks 4 have small widths, and accordingly the amplitude V1 of the read-out signal 5 is small.

Fourth Step

In this step, the track Tr(n+1) is replayed to detect a read-out signal (first read-out signal) 6. Here, the amplitude of the read-out signal 6 is detected. In FIG. 1(b), the recording marks 4 are never wider than the track and do not produce spillover effects on adjacent tracks. The resultant read-out signal 6 has an amplitude V2=0.

Fifth Step

The second to fourth steps are repeated with different quantities of recording light in the second step. FIG. 1(c) shows results of recording with an increased quantity of light (light beam 7) compared to the case in FIG. 1(b). The edges of the recording marks 8 are located very close to the edges of the track. Under these circumstances, the amplitude V3 of a read-out signal 9 from the track Tr(n) is large, whereas the amplitude V4 of a read-out signal 10 from the track Tr(n+1) remains 0 because the recording marks 8 produce small spillover effects on the track Tr(n+1). FIG. 1(d) shows results of recording with a further increased quantity of light (light beam 11). The edges of the widened recording marks 12 in the tracks Tr(n) and Tr(n+2) exist in the adjacent track Tr(n+1). Accordingly, the amplitude V5 of the signal 13 reproduced from the track Tr(n) is large, and the amplitude V6 of the signal 14 reproduced from the track Tr(n+1) is also large.

Sixth Step

Now, the read-out signals (to be more precise, the amplitudes V(n) and V(n+1) of the signals) from the tracks Tr(n) and Tr(n+1) are matched with the quantities of recording light FIG. 2 is drawn by plotting the amplitudes V(n) and V(n+1) of the read-out signals reproduced respectively from the track Tr(n) and its adjacent track Tr(n+1) against the quantities of recording light, with recording marks being written in the tracks Tr(n) and Tr(n+2) under a recording condition illustrated in FIG. 1(b) (condition (b)), that illustrated in FIG. 1(c) (condition (c)), and that illustrated in FIG. 1(d) (condition (d)). When the quantity of recording light is small (FIG. 1(b)), the amplitudes V(n) and V(n+1) are both small. However, when the quantity of recording light increases and, as a result, the recording marks grow wider, the amplitude V(n) increases, followed by increases of the amplitude V(n+1). The large amplitude V(n) signifies the fact that the recording marks in the track Tr(n) are sufficiently wide. The relatively large amplitude V(n+1) signifies the fact that the recording marks in the track Tr(n) have grown too wide and come to produce large spillover effects on the adjacent track Tr(n+1).

A suitable quantity of recording light can be found based on an optimum quantity of recording light which meets both conditions that the amplitude V(n) should be relatively large and that the amplitude V(n+1) should be relatively small. The first condition is met when the amplitude V(n) is, for example, in the vicinity of its maximum value, within predetermined percentage points below the maximum value, equal to a predetermined value, or larger than a predetermined value. The second condition is met when the amplitude V(n+1) is, for example, in the vicinity of 0, not larger than a predetermined percentage points of the maximum value, equal to a predetermined value, or smaller than a predetermined value.

If the first and second conditions are met when the quantity of recording light is in a particular range, the optimum quantity of recording light is desirably set to the midpoint value (or median) of the range (a set of values) so that the designated quantities are affected by a variety of errors to a least extent.

Thus, the quantity of recording light is maintained at its optimum value according to the present embodiment. Besides, in magnetic-field-modulated recording, the quantity of recording light is variable, but the length (size along the track) of the recording mark remains constant; therefore, only the width of the recording marks can be optimized through detection of changes in read-out signals.

FIG. 3 is a flow chart showing specific steps to found an optimum recording condition according to the method shown in FIG. 1(a) to FIG. 1(d). The process will be explained in specific detail based on the flow chart.

An erasing pattern (a first test pattern) is recorded in the adjacent tracks Tr(n−1) and Tr(n+1) using a large quantity of recording light which is, for example, within a predetermined range (Step 1). The quantity of recording light is then set to an initial value, which is relatively low (Step 2). In Step 3, a test pattern (a second test pattern) is recorded in the tracks Tr(n) and Tr(n+2) using the quantity of recording light set in Step 2. The quantity of light is then set to a predetermined reproduction value (Step 4). The test pattern is thus read from the track Tr(n) to detect the amplitude of a read-out signal (a second read-out signal) 5 (Step 5). The detected amplitude of the signal is stored in association with the quantity of recording light (Step 6). Subsequently, the test pattern is read from the track Tr(n+1) to detect the amplitude of a readout signal (a first read-out signal) 6 (Step 7). The detected amplitude of the signal is stored in association with the quantity of recording light (Step 8). In Step 9, the quantity of recording light is raised by a predetermined value. The resultant quantity of recording light is evaluated to see if it is in a test range (Step 10). If the result of the evaluation in Step 10 is such that the quantity of recording light falls within a test range, the process returns to Step 3 in which another test pattern will be recorded. If the result of the evaluation in Step 10 is such that the quantity of recording light falls out of a test range, the process proceeds to Step 11 in which the amplitudes of signals stored in Step 6 and Step 8 are searched for a range of quantities of recording light that meet the foregoing first and second conditions. Finally, the midpoint value of the range is designated as an optimum quantity of recording light (Step 12).

As detailed in the description so far, according to the present embodiment, to determine an optimum recording condition for the track Tr(n), a condition under which a sufficiently strong read-out signal is reproduced from the track Tr(n) is found through detection of the amplitude V(n) of the read-out signal, and a condition under which recording bits do not spill over from the track Tr(n) is found through detection of the amplitude V(n+1) of a signal reproduced from the track Tr(n+1) which is adjacent to the track Tr(n). Hence, an optimum recording condition can be found precisely even when recording sensitivity differs between the tracks Tr(n) and Tr(n+1) as is the case when information is recorded in both the land and the groove.

The method to optimize (or to control, in general) the quantity of recording light in accordance with the present embodiment is not limited to the above description and may vary in various ways. For example, subsequently to Step 1, test patterns may be recorded in different parts of each of the tracks Tr(n) and Tr(n+2) using recording light with a plurality of quantities, followed by reading all the test patterns recorded in the tracks Tr(n) and Tr(n+1) to determine an optimum recording condition. Further, those steps which involve the detection of the amplitude of a signal reproduced from a track and the subsequent associating of the amplitude with the quantity of recording light may be of course effected first on either one of the tracks Tr(n) and Tr(n+1).

In the present embodiment, test patterns (including erasing patterns) are written in the tracks Tr(n−1) and Tr(n+2). This is beneficial to increase the amplitudes V(n) and V(n+1), but not essential.

So far, the description has been focused on the optimization (or setting, in general) of the quantity of recording light To optimize the strength of a recording magnetic field, the strength of a recording magnetic field is increased gradually with the quantity of recording light being fixed, and the aforementioned steps are performed on the strength of a recording magnetic field. The width of the recording marks can be controlled to be optimum through observation of the amplitude of a reproduction signal.

Embodiment 2

Figure 4:
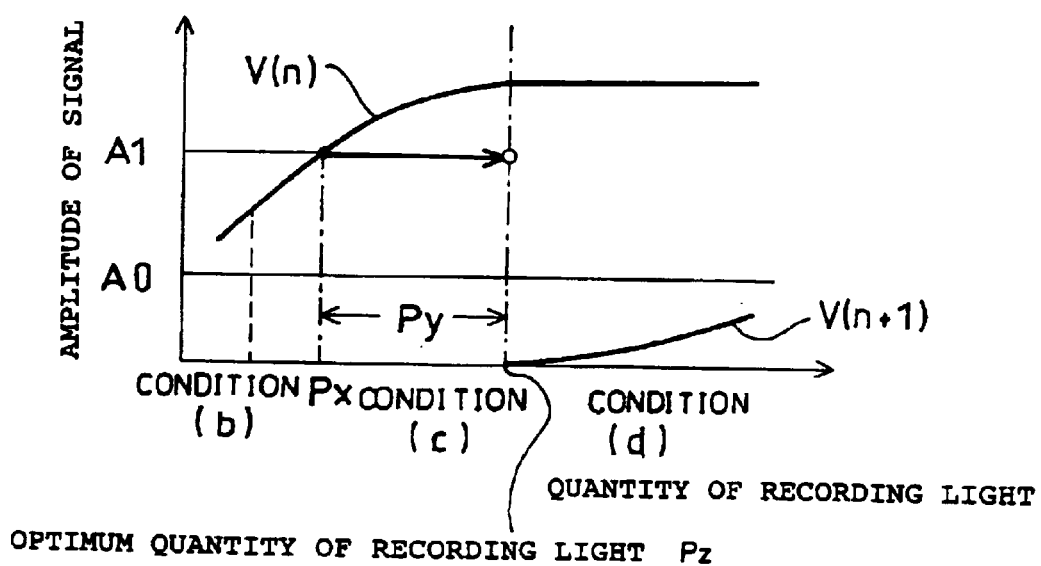
FIG. 4 is a graph showing the amplitudes of readout signals from tracks Tr(n) and Tr(n+l) in accordance with embodiment 2.
Figure 5:
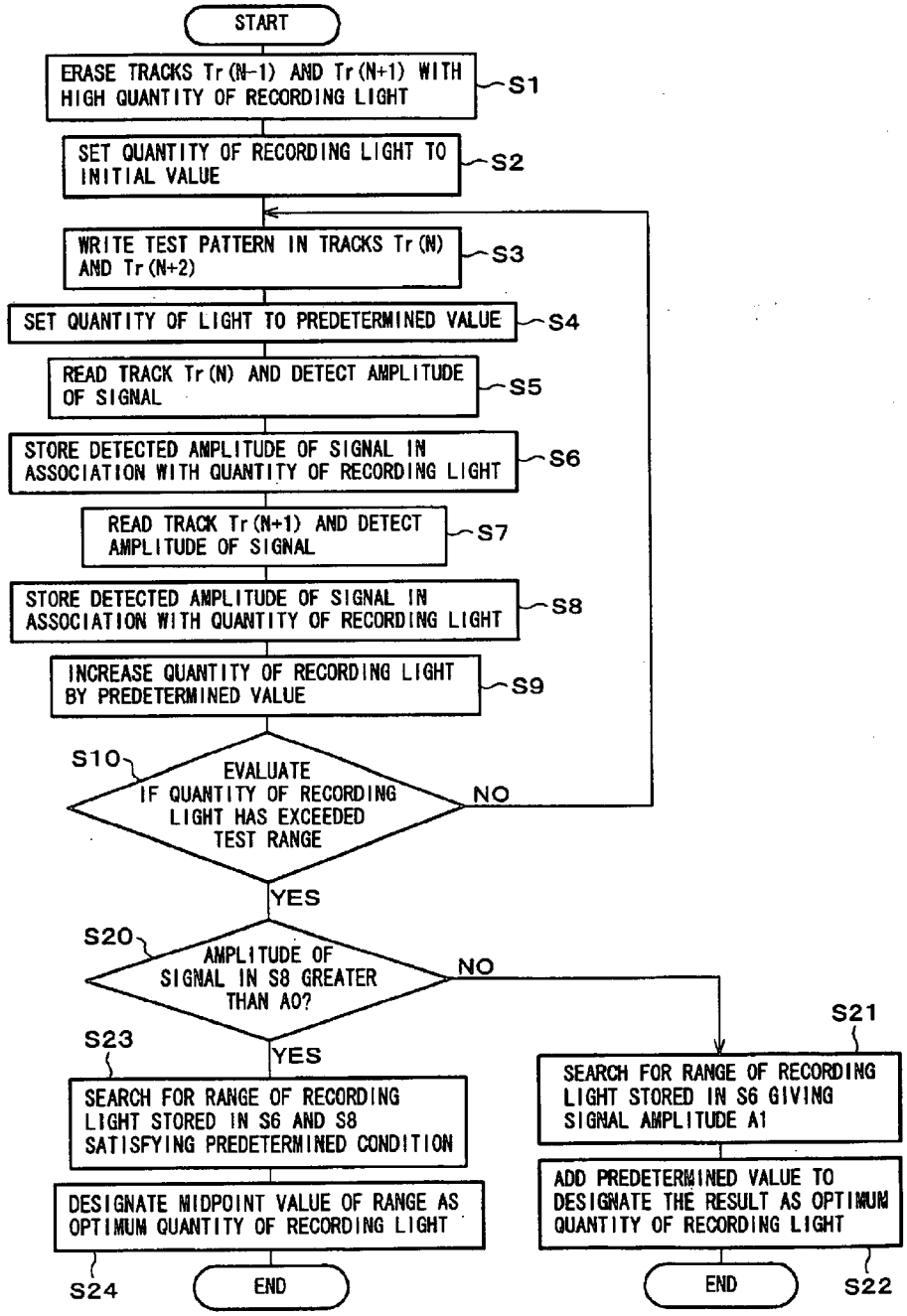
FIG. 5 is a flow chart showing a method to control a recording condition in accordance with embodiment 2.

Now the following description will discuss another embodiment of the present invention in reference to FIG. 4 and FIG. 5. Here, for convenience, the members of the present embodiment that are identical to those of embodiment 1 will not be explained in detail, or their description will be totally omitted.

According to embodiment 1, changes were detected in the amplitudes of signals reproduced from the track Tr(n) and its adjacent track Tr(n+1) to determine an optimum quantity of light In some cases, however, this method fails and it becomes impossible to determine an optimum quantity of light FIG. 4 is drawn by plotting the amplitudes V(n) and V(n+1) of the read-out signals reproduced respectively from the track Tr(n) and its adjacent track Tr(n+1) against the quantities of recording light, with recording marks being written in the tracks Tr(n) and Tr(n+2) under a recording condition illustrated in FIG. 1(b) (condition (b)), that illustrated in FIG. 1(c) (condition (c)), and that illustrated in FIG. 1(d) (condition (d)). When the quantity of recording light projected to the track Tr(n) increases and, as a result, the recording marks grow wider, the amplitude V(n) increases first. Then, the amplitude V(n+1) of a signal reproduced from the adjacent track Tr(n+1) also increases somewhat later but steadily due to spillover effects from the recording marks.

In embodiment 1, conditions such that the amplitude V(n+1) of a signal reproduced from the adjacent track Tr(n+1) equals a predetermined threshold amplitude A0 may be designated as the upper limit of the optimum quantity of recording light at which recording is negatively affected by. spillover effects of the recording marks. However, in some cases, for example, when the quantity of a recording laser beam has a limited maximum value, or when the optical recording medium possesses irregular recording sensitivity, a maximum quantity of recording light is still insufficient to increase the amplitude of a signal reproduced from the adjacent track Tr(n+1) to reach a predetermined signal amplitude A0 which is given as a threshold value to judge whether or not recording is negatively affected by spillover effects of the recording marks. Embodiment 1 entails this problem.

In view of this problem, the present embodiment is adapted to be compatible to such a case, whereby the optimum quantity of light is determined based only on changes in the amplitude V(n) of a signal reproduced from the track Tr(n). Explanation in detail will be given immediately below.

Reference is now made to FIG. 4. Recording marks are written in the track Tr(n) with a sufficient width using recording light having a quantity at which the amplitude is sufficiently large. However, if recording marks are written using recording light having a quantity at which the amplitude V(n) takes its maximum value, the resultant recording marks may be wider than the track Tr(n) and produce spillover effects to an adjacent track Tr(n+1). Taking this possibility into consideration, an amplitude Al that is slightly smaller than the maximum value of the amplitude V(n) is designated as a threshold value, and a quantity of recording light Px at which the amplitude V(n) is equal to the amplitude A1 is detected as the lower limit of an optimum quantity of recording light for the track Tr(n). An optimum quantity of recording light Pz for the track Tr(n) is determined by so summing the quantity of recording light Px and a predetermined quantity of recording light Py (Pz=Px+Py) that resultant recording marks will not produce spillover effects to adjacent tracks. It is desirable to set the predetermined quantity of recording light Py so that it allows for various adverse effects of errors to a greatest extent possible.

An alternative to this scheme whereby an optimum quantity of recording light is determined by adding a predetermined value Py to Px is to multiplying Px by a predetermined multiplier. Other predetermined calculations are also applicable.

FIG. 5 is a flow chart showing steps in accordance with the method to determine recording conditions, which will be detailed in following paragraphs. Note that description about Step 1 to Step 10 is omitted because they are identical to Step 1 to Step 10 of embodiment 1 showing in the flow chart of FIG. 3.

Following Step 10 of embodiment 1, the amplitude associated with the largest value among the quantities of recording light which were stored in Step 8 and then evaluated to be within a test range is further evaluated to see if it exceeds a predetermined amplitude A0 (Step 20). If the result of the evaluation in Step 20 is such that the amplitude does not exceed a predetermined amplitude A0, the quantities of recording light stored in association with their amplitudes of signals in Step 35 are searched for a quantity of recording light that gives the amplitude A3 (Step 21). A predetermined quantity of recording light is added to the quantity of recording light found in the search in Step 21 to determine an optimum quantity of recording light (Step 22). If the result of the evaluation in Step 20 is such that the amplitude exceeds the predetermined amplitude A0, the process proceeds to Step 23 in which the amplitudes of signals stored in Step 6 and Step 8 are searched, similarly to Step 11 shown in FIG. 11, for a range of quantities of recording light that meet the predetermined conditions. Then, the midpoint value of the range is designated as an optimum quantity of recording light (Step 24).

As detailed in the description above, a maximum recording condition can be determined even if the quantity of a recording laser beam has a limited maximum value, or if the optical recording medium possesses irregular recording sensitivity, by the method to determine recording conditions in accordance with the present embodiment.

In the present embodiment, an optimum quantity of recording light has been determined based only on the amplitude V(n) of a signal reproduced from the track Tr(n) when the upper limit of quantities of recording light cannot be determined based on the amplitude V(n+1) of a signal reproduced from the adjacent track Tr(n+1). Alternatively, without any precondition, an optimum quantity of recording light may be determined by performing a predetermined calculation on the quantity of recording light at which the amplitude V(n) of a signal reproduced from the track Tr(n) equals a predetermined value.

Put it differently, this alternative scheme can be implemented by omitting the fourth step and substituting new steps for the sixth step in the process of determining an optimum quantity of recording light detailed in the description of embodiment 1. The fourth step was a step in which the amplitude V(n+1) of a signal 6 reproduced from the adjacent track Tr(n+1) is detected. The new steps replacing the sixth step are those in which a quantity of recording light is determined at which the amplitude V(n) of a signal 5 reproduced from the track Tr(n) on which the optimization is to be effected equals a predetermined value (the second recording condition), a predetermined calculation is performed on the resultant quantity of recording light, and a recording condition under which the quantity of recording light causes wider recording marks than does the result of the calculation is designated as an optimum recording condition.

The alternative scheme takes less time to determine a recording condition.

For the sake of cutting down on the time taken to determined a recording condition, an optimum quantity of recording light can be determined also by performing a predetermined calculation (substraction of a predetermined value, multiplication by a predetermined multiplier, etc.) on the quantity of recording light at which the amplitude V(n+1) of a signal reproduced from the track Tr(n+1) equals a predetermined value.

Specifically, this scheme can be implemented by omitting the third step and substituting new steps for the sixth step in the process of determining an optimum quantity of recording light detailed in the description of embodiment 1. The third step was a step in which the amplitude V(n) of a signal 5 reproduced from the adjacent track Tr(n) on which the optimization is to be effected is detected. The new steps replacing the sixth step are those in which a quantity of recording light is determined at which the amplitude V(n+1) of a signal 6 reproduced from the track Tr(n+1) equals a predetermined value (the first recording condition), a predetermined calculation is performed on the resultant quantity of recording light, and a recording condition under which the quantity of recording light causes smaller recording marks than does the result of the calculation is designated as an optimum recording condition.

To optimize the strength of a recording magnetic field, the strength of a recording magnetic field is increased gradually with the quantity of recording light being fixed, and the aforementioned steps are performed on the strength of a recording magnetic field. The width of the recording marks can be controlled to be optimum through observation of the amplitude of a reproduction signal.

Embodiment 3

The following description will discuss another embodiment of the present invention in reference to FIGS. 2, 6(a) to 6(d), 7, 8, 9, 10(a) to 10(c), 11, 12, and 13. Here, for convenience, the members of the present embodiment that are identical to those of the previous embodiments will not be explained in detail, or their description will be totally omitted.

Those methods detailed in embodiments 1 and 2 were such that the width of recording marks was readily controllable based on variations in the amplitude of a signal reproduced from a specified track and those of a signal reproduced from an adjacent track which is affected by spillover effects. However, the detecting sensitivity is not sufficiently high, because the amplitude V(n+1) of a signal reproduced from the track Tr(n+1) is small as shown in FIG. 2.

Accordingly, in the present embodiment, a method will be discussed whereby the amplitude varies greatly so that the optimum quantity of recording light is detectable with high sensitivity.

Figure 6A:
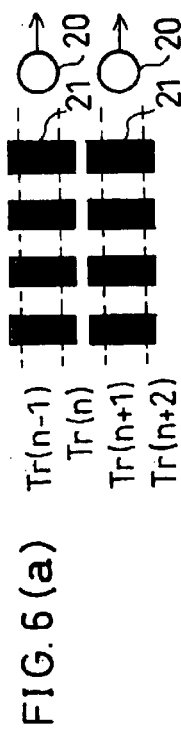
FIG. 6(*a*) to FIG. 6(*d*) are diagrams illustrating a method to control a recording condition in accordance with embodiment 3.

Large (Wide) recording marks 21 are written (with a width exceeding that of the track) in advance in both adjacent tracks Tr(n−1) and Tr(n+1), using a relatively high quantity of a recording light beam 20 as shown in FIG. 6(a). Under these circumstances, the recording marks 21 are written based on a recording clock according to an external clock scheme, which will be discussed later in detail. The recording marks 21 constitute a recording pattern which is the reverse of the pattern constituted in the tracks Tr(n) and Tr(n+2). Hereinafter, the pattern formed in the tracks Tr(n−1) and Tr(n+1) will be referred to as a reverse pattern (a first test pattern), and the pattern formed in the tracks Tr(n) and Tr(n+2) will be referred to a normal pattern (a second test pattern).

Subsequently, recording marks 23 are written forming a normal pattern shown in FIG. 6(b) by projecting a low quantity of a recording light beam 22 to the track Tr(n) while reversing the recording magnetic field. Under these circumstances, a normal pattern is formed based on a recording clock according to an external clock scheme, which will be discussed later in detail; therefore, the recording marks 23 are written in phase with the reverse pattern in an adjacent track. If the recording marks 21 in the adjacent tracks are excessively wide, their edges will be cut off when the recording marks 23 are written. Since the recording marks 23 have a small width, the amplitude V10 of a signal 24 reproduced from the track Tr(n) is not sufficiently large. Besides, the recording marks 21 are written forming a reverse pattern in the adjacent tracks; cross-talk which occurs during reproduction eliminates parts of the signals of the recording marks 23, further reducing the amplitude V10. In contrast, the recording marks 21 have a large width, the amplitude V11 of a signal 25 reproduced from the track Tr(n+1) is sufficiently large.

If the quantity of recording light is increased in an incremental manner in the above process, the resultant recording marks 23 grow wider in an accordingly incremental value. In FIG. 6(c), recording marks 27 are written in the tracks Tr(n) and Tr(n+2) using a higher quantity of a recording light beam 26 than that of the light beam 22. A signal 28 with an amplitude V12 is reproduced from the track Tr(n), and a signal 29 with an amplitude V13 is reproduced from the adjacent track Tr(n+1).

As the quantity of recording light is increased, the recording marks 21 have their edges being cut off and grow narrower accordingly. In addition, the recording marks in the adjacent tracks grow wider, causing more cross-talk. In FIG. 6(d), recording marks 31 are written with a greater width than the tracks Tr(n) and Tr(n+2) by writing a normal pattern while projecting a larger quantity of recording light beam 30 than that of the light beam 26 on the tracks Tr(n) and Tr(n+2). The read-out signal 32 has a sufficiently large amplitude V14. Under these circumstances, the recording marks 21 have their edges being cut off during the process of the magnetic-field-modulated recording. This leaves the middle parts intact, which will become recording marks 34. Since the recording marks 34 has a smaller width, the amplitude V15 of the reproduction signal 33 is not sufficiently large. Besides, cross-talk from the recording marks 31 in the adjacent tracks eliminates parts of signals of the recording marks 34, further reducing the amplitude. These facts signify that the amplitude of a reproduction signal is reduced by cross-erase as a result of an increased quantity of recording light and further reduced by cross-talk from the reverse pattern in the adjacent tracks.

Figure 6B:
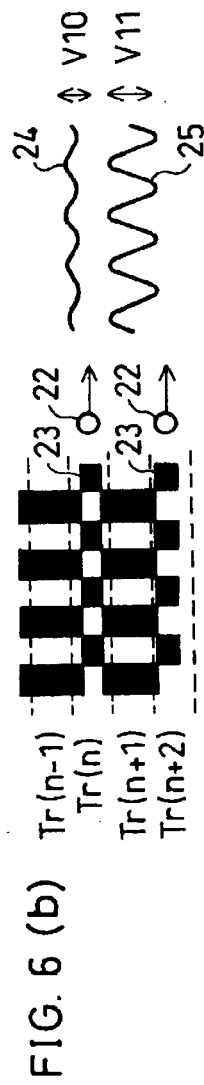
Figure 6C:
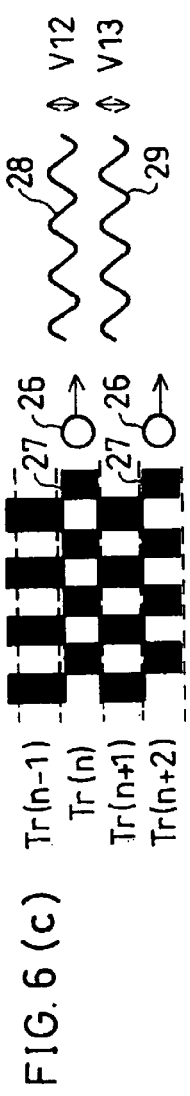
Figure 6D:
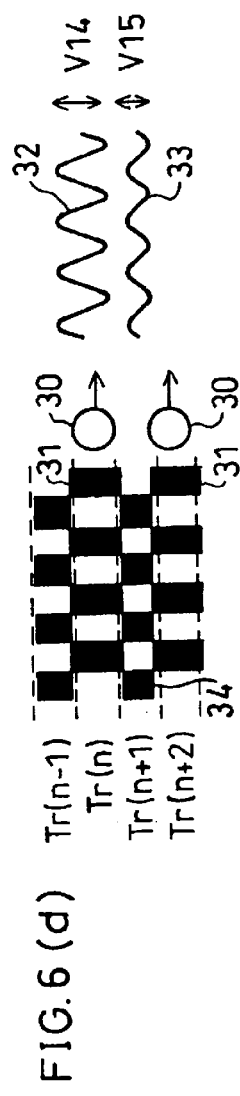
Figure 7:
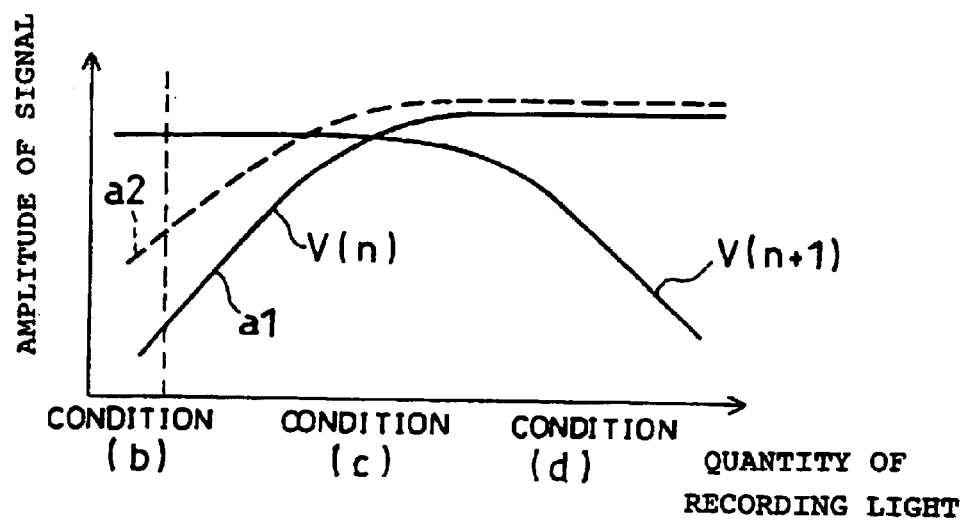
FIG. 7 is a graph showing the amplitudes of readout signals from tracks Tr(n) and Tr(n+1) in accordance with embodiment 3.

FIG. 7 shows the amplitudes V(n) and V(n+1) of reproduction signals showing in FIG. 6(b), FIG. 6(c), and FIG. 6(d). It is understood from FIG. 7 that a1 is far smaller than a2, where a1 is the amplitude V(n) when the quantity of recording light is low, and a2 is the amplitude V(n) in embodiments 1 and 2. This is because parts of recording marks forming the normal pattern are eliminated by cross-talk from the reverse pattern in the adjacent tracks. Under these circumstances, the amplitude V(n+1) of a signal reproduced from the reverse pattern in the adjacent track is large. When the quantity of recording light is increased, the recording marks grow wider, and the cross-talk decrease. As a result, the amplitude V(n) increases gradually. When the quantity of recording light is further increased, the recording marks forming a reverse pattern have their edges cut off gradually, and the amplitude V(n+1) decreases significantly.

When the quantity of recording light is such that both the amplitudes V(n) and V(n+1) are large, the recording marks are wide in the track Tr(n), and there occurs little cross-talk in the adjacent tracks. For these reasons, the quantity of recording light that satisfies these conditions should be designated as an optimum quantity of recording light Specifically, two conditions should be met: the first one is such that when the amplitude V(n) is, for example, in the vicinity of its maximum value, within predetermined percentage points below the maximum value, equal to a predetermined value, or larger than a predetermined value, and the second condition is such that the amplitude V(n+1) is, for example, in the vicinity of its maximum value, within predetermined percentage points below the maximum value, equal to a predetermined value, or larger than a predetermined value. The optimum quantity of recording light is desirably set to the midpoint value of the range of the quantity of recording light satisfying the two conditions, since the setting leaves sufficient margins.

Writing reverse patterns in adjacent tracks in this manner, the amplitude varies greatly in comparison to embodiments 1 and 2, so that the optimum quantity of recording light is detectable with high sensitivity.

Figure 8:
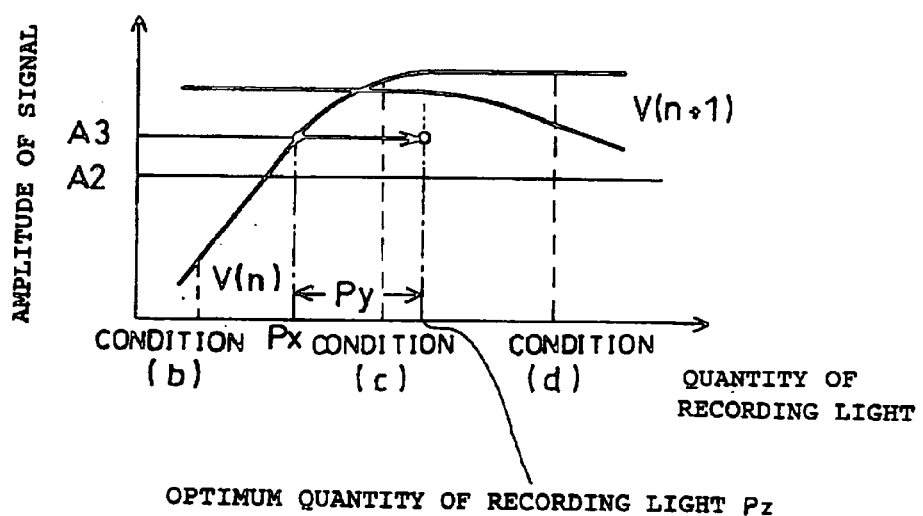
FIG. 8 is a graph showing the amplitudes of other read-out signals from tracks Tr(n) and Tr(n+1) in accordance with embodiment 3.

In some cases, for example, when the quantity of a recording laser beam has a limited maximum value, or when the optical recording medium possesses irregular recording sensitivity, a maximum quantity of recording light is still insufficient to increase the amplitude of a signal reproduced from the adjacent track Tr(n+1) to reach a predetermined signal amplitude A2 which is given as a threshold value to judge whether or not recording is negatively affected by spillover effects of the recording marks as shown in FIG. 8. In such an event, an optimum quantity of recording light is determined based only on the amplitude V(n) of a signal reproduced from the track Tr(n).

If recording marks are written using recording light having a quantity at which the amplitude V(n) takes its maximum value, the resultant recording marks may be wider than the track Tr(n). Taking this possibility into consideration, a quantity of recording light Px is detected which gives an amplitude A3 that is slightly smaller than the maximum amplitude as shown in FIG. 8. An optimum quantity of recording light Pz for the track Tr(n) is determined by so summing the quantity of recording light Px and a predetermined quantity of recording light Py that resultant recording marks will not produce spillover effects to adjacent tracks (alternatively, by performing a predetermined calculation on Px, e.g., multiplication of Px by a predetermined multiplier).

In the above description, an optimum quantity of recording light has been determined based only on the amplitude V(n) when the amplitude V(n+1) does not decrease to a predetermined value A2. Alternatively, without any precondition, an optimum quantity of recording light may be determined based only on the amplitude V(n).

In the present embodiment described so far, test patterns (including erasing patterns) have been written in the tracks Tr(n−1) and Tr(n+2). This is beneficial to increase the amplitudes V(n) and V(n+1), but not essential.

Now, referring to FIG. 9, an optical recording device will be explained which executes a method of controlling recording conditions in the same manner as that shown in FIG. 6(a) to FIG. 6(d). An identical optical recording device can be used to execute the method of controlling recording conditions in accordance with embodiment 1.

During the formation of a test pattern, the CPU (optimum recording condition determining means) 46 sends a control command c3 to a recording light quantity determining circuit So which produces a recording light quantity control signal p2 as an output. The recording light quantity control signal p2 is transmitted to a drive circuit 47 via a switching circuit 48 according to a switching command c2 from the CPU 46. Receiving a drive current f from the drive circuit 47, the semiconductor laser 41 projects a strong laser beam b1 to a magneto-optical disk 40. Simultaneously, the CPU 46 sends a control command c4 to a test pattern generating circuit 53 which produces a recording signal g in normal and reverse patterns shown in FIG. 4. As the recording signal is received by the drive circuit 52, the magnetic head 5I generates, from a drive current h, a recording magnetic field which writes normal and reverse patterns on the magneto-optical disk 40. In this device, the CPU 46, the recording light quantity determining circuit 50, the test pattern generating circuit 53, the drive circuits 47 and 52, the semiconductor laser 41, and the magnetic head 51 constitute recording means.

Now, the detection of the amplitude of a reproduction signal will be discussed. Responsive to the switching command c2 sent from the CPU 46, a reproduction light quantity determining circuit 49 sends a reproduction light quantity control signal P1 to the drive circuit 47 via the switching circuit 48. Receiving the drive current f, the semiconductor laser 41 projects a weak laser beam b1 to the magneto-optical disk 40. The reflection beam b2 is guided to a photodiode 42. Read-out signals r1 and r2 are reproduced from the magneto-optical disk 40. The former will be amplified by an amplifier 43.

The latter will be provided to an A/D converter 44 and a clock deriving circuit 45. The clock deriving circuit 45 derives an external clock c from the reproduction signal r2 and sends it to the test pattern generating circuit 53. Thus, the normal pattern is written in the target track in phase with the reverse pattern in an adjacent track. The external clock c is also transmitted to the A/D converter 44 where a read-out signal r2 is converted to digital values d. The digital values d is transmitted to the CPU 46 where the amplitude of the read-out signal r2 is detected. In this device, the CPU 46, the photodiode 42, the amplifier 43, and the A/D converter 44 constitute read-out means.

Figure 9:
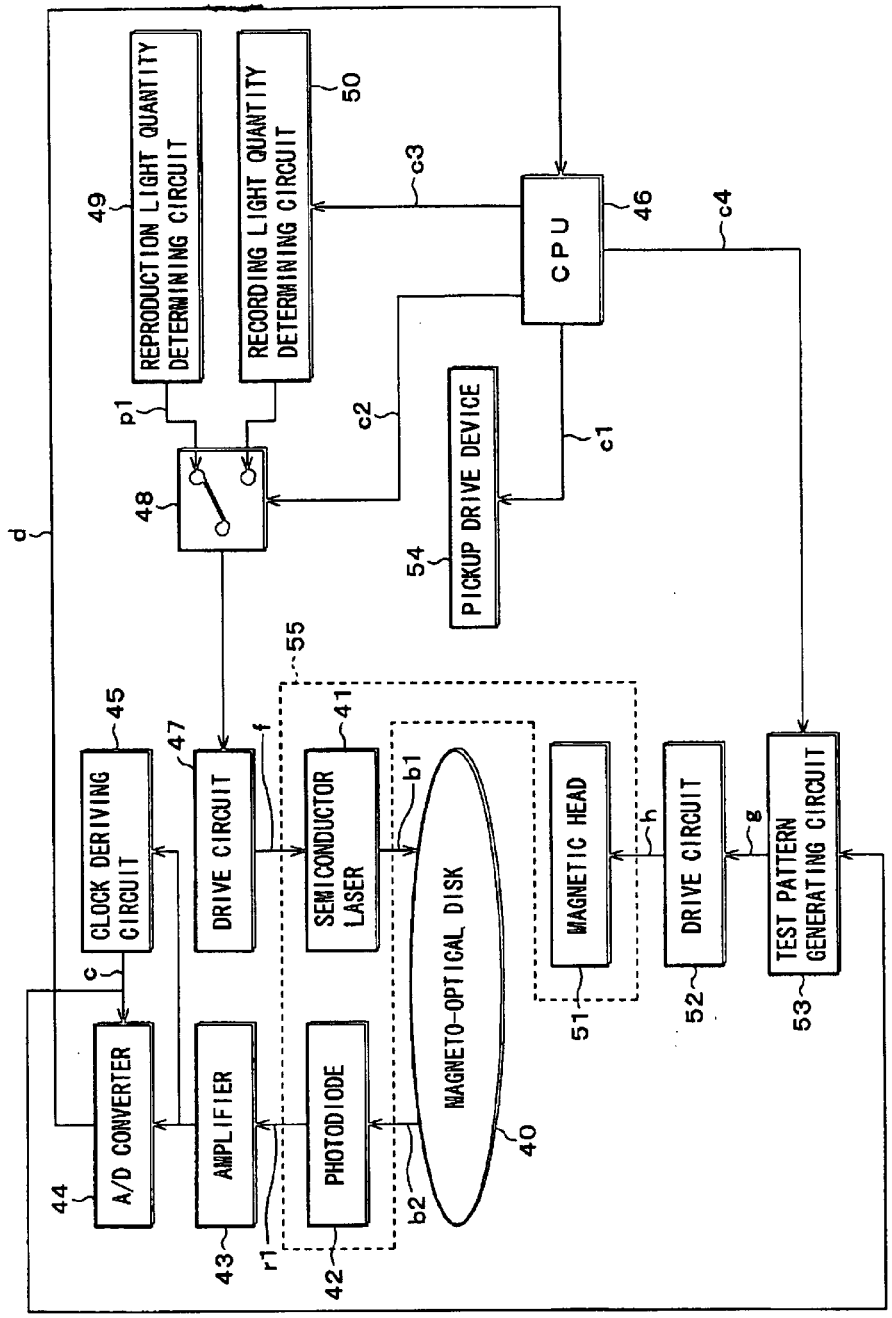
FIG. 9 is a block diagram illustrating, as an example, a configuration of a device which controls a recording condition in accordance with the present invention.

The photodiode 42, the semiconductor laser 41, and the magnetic head 51 are disposed in a pickup 55 which is denoted by dotted lines in FIG. 9. Responsive to a control command c1 from the CPU 46, a pickup drive device 54 drives the pickup 55 in such a manner that the pickup 55 can move and project the light beam b1 onto the target tracks Tr(n) and Tr(n+2) and the non-target tracks Tr(n−1) and Tr(n+1) shown in FIG. 6(a) to FIG. 6(d).

The CPU 46 sends a control command c3 to cause the quantity of recording light to gradually increase, a control command c1 to cause the light beam to move to a predetermined track, and a control command c4 to causes a normal pattern to be written. The CPU 46 sets the light beam b1 to the quantity of reproduction light through a control command c2 and detects the amplitude of the readout signal r2 based on the input digital values d. Then, the CPU 46 sequentially stores an amplitude for every quantity of recording light and designates a quantity of recording light that satisfies predetermined conditions as an optimum quantity of recording light.

Figure 10A:
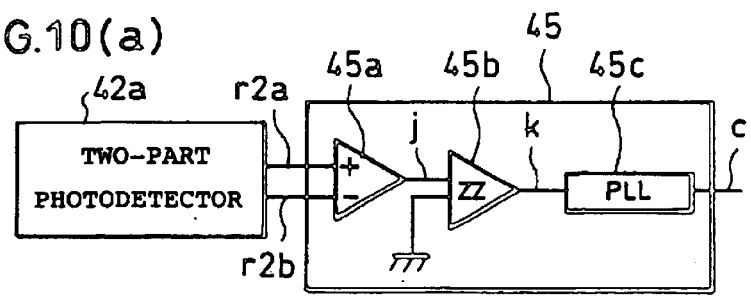
FIG. 10(*a*) is a diagram illustrating a configuration of a clock deriving circuit shown in FIG. 9.

FIG. 10(a) illustrates in detail the clock deriving circuit 45 shown in FIG. 9. A two-part photodetector 42a receives the reflection beam b2 from the magneto-optical disk 40. Two output signals r2a and r2b are supplied to a differential amplifier 45a in the clock deriving circuit 45 to produce a well-known push-pull tracking error signal j. The tracking error signal j carries in it a read-out signal (will be explained later in detail) from a reference mark 58. To detect the reference mark 58, a hysteresis comparator 45b compares the tracking error signal j with ground level to produce a reference mark detection signal k. When the hysteresis comparator 45b supplies the reference mark detection signal k to a PLL circuit 45c, the PLL circuit 45c produces an external clock c for output in phase with the reference marks 58.

Figure 10B:
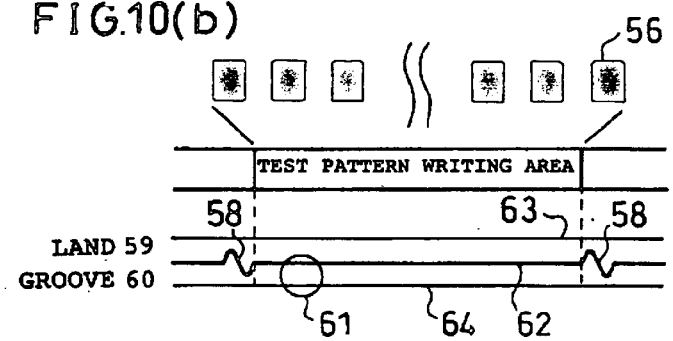
Figure 10C:
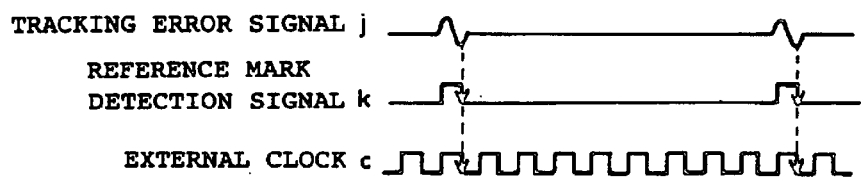

FIG. 10(b) and FIG. 10(c) are waveform diagrams illustrating operations of the clock deriving circuit 45 of FIG. 10(a). In FIG. 10(b), the normal and reverse patterns are written in the respective tracks, i.e., the land 59 and the groove 60. Here, for convenience, we will designate the groove 60 as the track Tr(n) and the land 59 as the track Tr(n−1), and no description will be given to the tracks Tr(n+1) and Tr(n+2). Reference marks 58 and test pattern recording areas 57 are arranged alternately along the tracks. Recording marks 56 are written in the test pattern recording area 57, forming a normal or reverse pattern. The sidewall 62 between the land 59 and the groove 60 wobbles with a certain period so as to record the non-erasable reference marks 58 which provide a physical reference regarding the positioning of the magneto-optical disk. Only the sidewall 62 between the land 59 and the groove 60 wobbles, and the opposite sidewalls 63 and 64 do not wobble. This arrangement restrains cross-talk from reference marks (not shown) which are adjacent to the reference marks 58 of interest in the direction perpendicular to the tracks. A test pattern recording area 57 is provided in every area between two adjacent reference marks 58.

For example, if a light spot 61 is used to perform tracking on the groove 60, the tracking error signal j carries over it a signal reproduced from a reference mark 58 as shown in FIG. 10(c). By binarizing the signal, the reference mark detection signal k is obtained. The reference mark detection signal k is provided to the PLL circuit 45c to obtain an external clock c which is in phase with the reference mark 58.

The device detailed here may be applicable to all the methods to determining recording conditions in accordance with embodiments of the present invention. Further, the device, although having been described so far in connection with an external clock, may adopt a clock produced by different means and is still capable of perform its tasks.

Now, referring to the flow chart of FIG. 11, a method to determine recording conditions will be explained in detail in accordance with the present embodiment.

A reverse pattern is written in advance in the adjacent tracks, Tr(n−1) and Tr(n+1), using a large quantity of recording light (Step 30). The quantity of recording light is set to an initial value which is relatively low (Step 31). A normal pattern is written in the tracks Tr(n) and Tr(n+2), using recording light with a quantity equal to the value set in Step 31 (Step 32). The light quantity of reproduction light is then set to a predetermined value (Step 33). The normal pattern in the track Tr(n) is read to detect the amplitude of a reproduction signal (Step 34). The amplitude is stored in association with the quantity of recording light (Step 35). Then, the reverse pattern in the track Tr(n+1) is read to detect the amplitude of a reproduction signal (Step 36). The amplitude is stored in association with the quantity of recording light (Step 37). The quantity of recording light is increased by a predetermined value (Step 38). The increased quantity of recording light is evaluated to see if it exceeds a test range (Step 39).

If the result of the evaluation in Step 39 is such that the quantity of recording light does not exceed a test range, the process returns to Step 32 in which another normal pattern is written. In contrast, if the result of the evaluation in Step 39 is such that the quantity of recording light exceeds a test range, the amplitude associated with the largest value among the quantities of recording light which were stored in Step 37 and then evaluated to be within a test range is further evaluated to see if it is smaller than a predetermined amplitude A2 (Step 40).

If the result of the evaluation in Step 40 is such that the amplitude is equal to, or larger than, the predetermined amplitude A2, the quantities of recording light stored in association with their amplitudes of signals in Step 35 are searched for a quantity of recording light that gives the amplitude A3 (Step 41). A predetermined quantity of recording light is added to the quantity of recording light found in the search in Step 41 to determine an optimum quantity of recording light (Step 42). If the result of the evaluation in Step 40 is such that the amplitude is smaller than the predetermined amplitude A2, the process proceeds to Step 43 in which the quantities of recording light stored in association with amplitudes in Step 35 and Step 36 are searched for a range of quantities of recording light that meet a predetermined condition. Finally, the midpoint value of the range is designated as an optimum quantity of recording light (Step 44).

Figure 12:
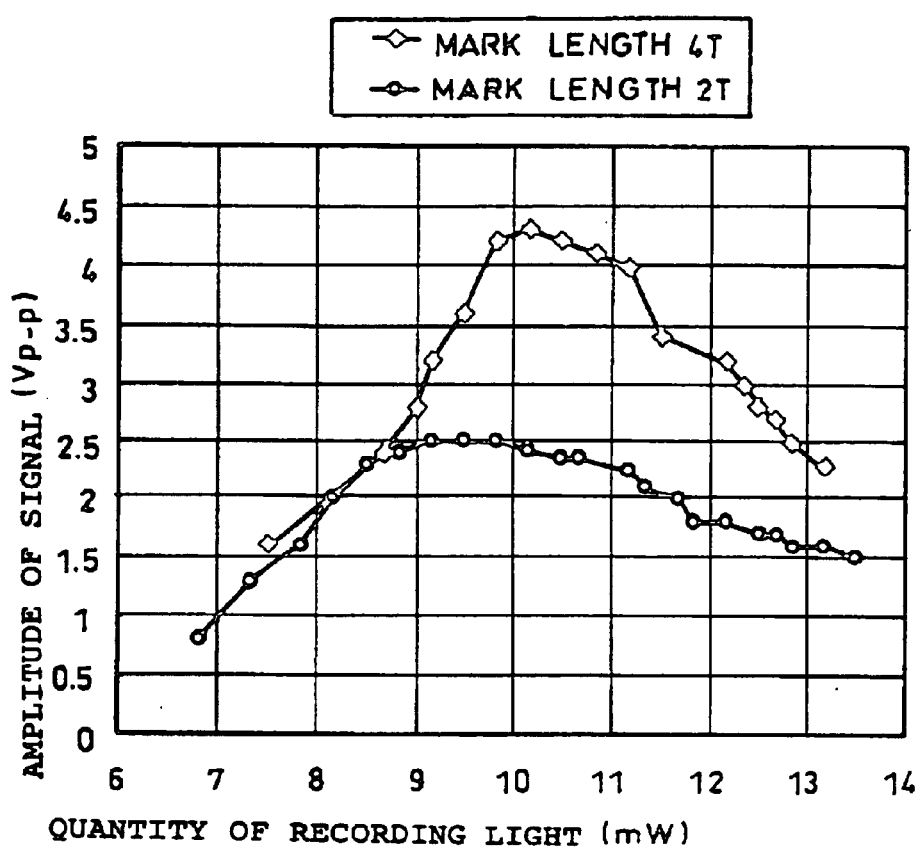
FIG. 12 is a graph showing how the amplitudes of reproduction signals change with the quantity of recording light according to a conventional technology.
Figure 13:
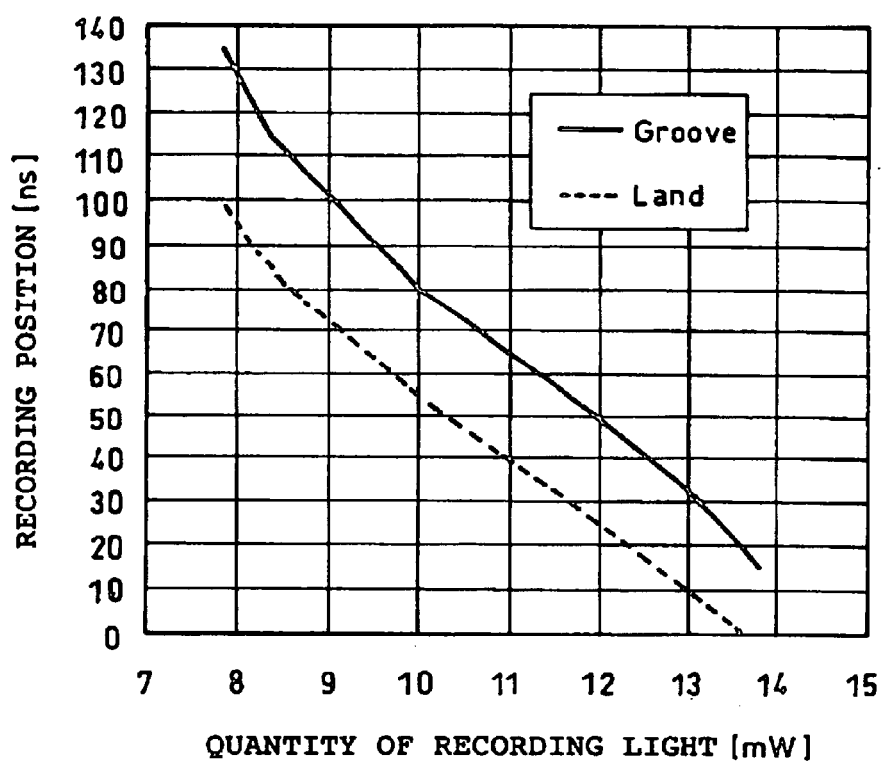
FIG. 13 is a graph showing recording positions which differ between adjacent tracks.

Now, data obtained from measurement of changes in the amplitude of a reproduction signal will be explained by way of an example of two different lengths of marks and empty spaces which are used to form the normal and reverse patterns. Reference is made to FIG. 12 and FIG. 13.

FIG. 12 shows the amplitudes of reproduction signals when the quantities of recording light disclosed in Japanese Laid-Open Patent Application No. 11-73700/1999 are used and those when the quantities of recording light obtained according to the method of controlling the strength of a recording magnetic field are used. According to the method, a reverse pattern is written first in both of the adjacent tracks of a specified track with a relatively high quantity of recording light, before a normal pattern is written in the specified track with a predetermined quantity of recording light Then, a reverse pattern is again written in the adjacent tracks with the same quantity of recording light as a normal pattern was written in the specified track. Finally, the specified track is read. Throughout these operations, the laser beam has a wavelength of 635 nm, the objective lens has an aperture ratio of 0.6, and the channel bit has a length T (modulated bit unit used in recording) of 47 ns. It is understood that when the mark length and the empty space length are both equal to 2T or 4T, changes are detectable in the amplitude of a signal resulting from the use of a quantity of recording light Put it differently, changes in the amplitude of a signal are detectable if the mark length and the empty space length are both 2T or greater.

Even under different conditions, for example, when the laser beam changes in its wavelength or the objective lens changes in its aperture ratio, the value 2T of the mark length and the empty space length is still valid in detecting changes in the amplitude of a signal. That is, even under the different conditions, the mark length and the empty space length are both equal to 2T.

Displacements of recording marks were measured which occurred along the track due to a difference in the quantity of recording light They were measured using a laser beam of the same wavelength, an objective lens of the same aperture ratio, and the channel bit of the same length as stipulated in FIG. 12. Results are shown in FIG. 13, which indicates that when the quantity of recording light is increased, temperature rises in an increasingly large portion of the optical recording medium, and therefore the recording mark is displaced opposite to the movement of the light spot.

Therefore, if data is collected in advance on displacements of recording marks which occur along the track due to different quantities of recording light as shown in FIG. 13, and there is provided means to correct a displacement of a recording bit according to the quantity of recording light (displacement correction means), marks and empty spaces can be arranged so that marks are aligned to marks or empty spaces along the direction perpendicular to the tracks in the reverse and normal patterns. If the mark length and the empty space length are both greater than 2T, an optimum quantity of recording light is detectable based on a change in the amplitude of a signal. The displacement correction means may be, for example, the means disposed in between the clock deriving circuit 45 and the test pattern generating circuit 53 along the path of the external clock c (see FIG. 9) so as to change the phase of the external clock c according to the quantity of recording light As to a third test pattern used in embodiment 5 (will be discussed later in detail), marks and empty spaces that form a reverse pattern in the tracks Tr(n), Tr(n+1), etc. can be arranged so that marks are aligned to marks or empty spaces along the direction perpendicular to the tracks if displacement correction means is provided similarly.

If the mark length and the empty space length are equal to, or greater than, the length of a channel bit that is required to prevent the displacement of a recording bit from producing adverse effects within a test range for the quantity of recording light, the length of a recording mark is great when measured along the track. Therefore, around the midpoint of the recording mark, the record position is not displaced due to the variable quantity of recording light By detecting the amplitude of a signal on which sampling is carried out around the midpoint of a recording mark, an optimum quantity of recording light becomes detectable without providing the means that corrects the displacement of a recording bit according to the quantity of recording light.

Suppose in FIG. 13 that the track Tr(n) is a groove, the test range for the quantity of recording light is from 8 mW to 13 mW, and the relatively high quantity of recording light which was used at the beginning (in the first step) in the recording in both of the adjacent tracks Tr(n−1) and Tr(n+1) was 11 mW. In this environment, the recording positions are located at about 40 ns in the adjacent tracks Tr(n−1) and Tr(n+1) in the first step, and the recording positions are located at about 130 ns in the tracks Tr(n) and Tr(n+2) in the third step with a quantity of recording light of 8 mW. Thus, the displacement of the recording bit amounts to about 90 ns. Therefore, the channel bit needs to have a length of 2T to prevent the displacement of the recording bit from producing adverse effects. Besides, if the quantity of recording light equals 13 mW, the recording positions are located at about 30 ns in the tracks Tr(n) and Tr(n+2). Thus, the displacement of the recording bit occurs in the opposite direction to the previous case, amounting to about 10 ns. Therefore, the channel bit needs to have a length of 1T to prevent the displacement of the recording bit from producing adverse effects. Overall, the channel bit needs to have a length of 3T to prevent the displacement of the recording bit from producing adverse effects.

Further, since the channel bit needs to have a length of 2T to detect the amplitude of a signal as mentioned in the above, the mark length and the empty space length are preferably equal to, or greater than, 2T+3T=5T provided that the track Tr(n) is a groove and also that the magneto-optical recording medium possesses characteristics shown in FIG. 13.

The description so far was based on an assumption that the track Tr(n) was a groove. When the track Tr(n) is a land, the empty space length can be determined in a similar manner so that the displacement can be successfully prevented from producing adverse effects.

If identical mark length and empty space length are to be used to determine the quantity of recording light for the groove and the land, the mark length and the empty space length are preferably determined so as to encompass the largest displacement in the same direction as the movement of a light spot and also in the opposite direction. Suppose that the magneto-optical recording medium possesses characteristics shown in FIG. 13, the test range for the quantity of recording light is from 8 mW to 13 mW, and the relatively high quantity of recording light which was used at the beginning (in the first step) in the recording in both of the adjacent tracks Tr(n−1) and Tr(n+1) was 11 mW. In this environment, if the adjacent track Tr(n+1) is a land, a displacement of the recording bit occurs during recording in the groove (track Tr(n)) with a quantity of recording light of 8 mW, amounting to about 90 ns. Therefore, the channel bit needs to have a length of 2T to prevent the displacement of a recording bit from producing adverse effects. If the adjacent track Tr(n+1) is a groove, a displacement of a recording bit occurs during recording in the land (track Tr(n)) with a quantity of recording light of 13 mW, amounting to about 55 ns. Therefore, the channel bit needs to have a length of 2T to prevent the displacement of a recording bit from producing adverse effects. Therefore, the channel bit needs to have a length of 4T (=2T+2T) to prevent the displacement of a recording bit from producing adverse effects. Therefore, the mark length and the empty space length are both preferably equal to, or greater than, 2T+4T=6T.

As detailed so far, provided that the two different lengths of marks and empty spaces which are used to form the normal and reverse patterns are both equal to, or greater than, (2+L)·T, where L·T is the length of a channel bit that is required to prevent the displacement of a recording bit from producing adverse effects under a certain recording condition, an optimum quantity of recording light becomes detectable without providing any means that corrects the displacement of a recording bit according to the quantity of recording light An optimum value is also available with high sensitivity when the marks and the empty spaces are of different lengths. However, if they share the same length, the direct current component of a signal can be rendered as being 0, and the amplitude of a signal can be detected with high precision in the detection of the amplitude (alternating current component) of the signal.

Embodiment 4

Another embodiment of the present invention will be discussed in reference to FIG. 14(a) to FIG. 14(c), FIG. 15, and FIG. 16. However, for convenience, the members of the present embodiment that are identical to those of the previous embodiments will not be explained in detail, or their description will be totally omitted.

In embodiment 3, we discussed a method and device to detect a change in the amplitude of a signal with high sensitivity by writing a reverse pattern in adjacent tracks. In the present embodiment, we will discuss a method to detect a change in the amplitude of a signal with further enhanced sensitivity.

Large (Wide) recording marks 71 are written in advance in tracks Tr(n) and Tr(n+2), using a high quantity of a light beam 70 as shown in FIG. 14(a). The quantity of recording light here only needs to be moderately high, because the only requirement is such that some parts remain unerased (will be explained later in detail). Preferably, the quantity of recording light is higher than a typical value to write wide recording marks as mentioned above. The recording marks 71 constitute a recording pattern which is identical to the aforementioned reverse pattern (the third test pattern).

Figure 14:
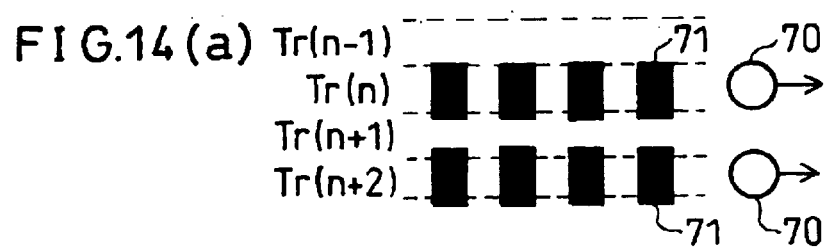
FIG. 14(*a*) to FIG. 14(*c*) are diagrams illustrating a method to control a recording condition in accordance with embodiment 4.
Figure 14:
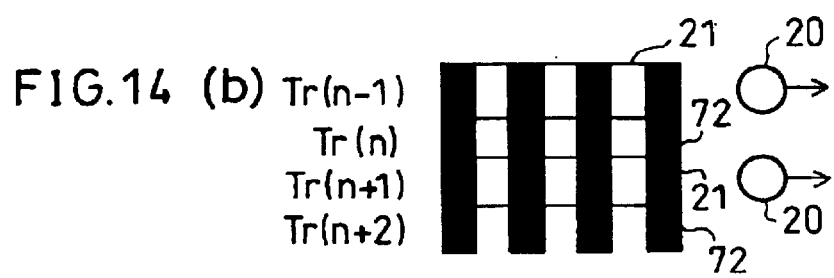
Figure 14:
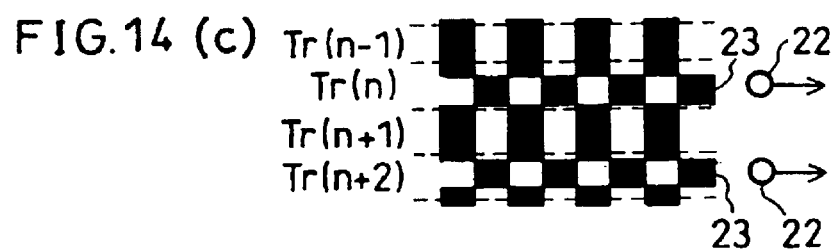

Subsequent operations illustrated in FIG. 14(b) and FIG. 14(c) are identical to those in embodiment 3. That is, wide recording marks 21 are written (with a width exceeding that of the track) in both adjacent tracks Tr(n−1) and Tr(n+1), using a relatively high light quantity of a recording light beam 20 as shown in FIG. 14 (b). The recording marks 21 constitute a recording pattern which is a reverse pattern. Thus, the wide recording marks 71 written in advance in the tracks Tr(n) and Tr(n+2) have their edges cut off, leaving narrower recording marks 72.

Recording marks 23 are then written constituting a normal pattern as shown in FIG. 14(c) by projecting a relatively low quantity of recording light beam 22 to the tracks Tr(n) and Tr(n+2). Here, in the track Tr(n) of interest, the normal pattern 23 is overwritten on the reverse pattern 72 as shown in FIG. 14(b). If the quantity of recording light is low, the reverse pattern remains unerased in many parts as shown in FIG. 14(c), which reduces the amplitude of a signal reproduced from the normal pattern. When the quantity of recording light is reduced, the reverse pattern remains unerased in correspondingly more parts, and the amplitude reproduced from the normal pattern decreases further accordingly. The more the reverse pattern is preserved, the more the amplitude is reduced.

Figure 15:
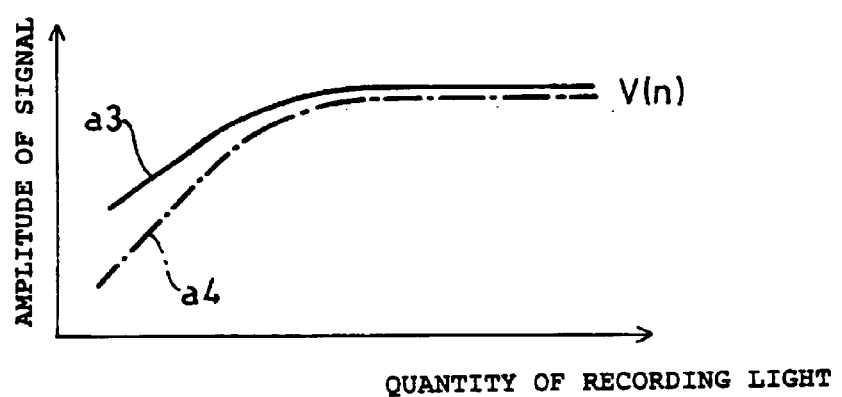
FIG. 15 is a graph showing the amplitudes V(n) of signals reproduced in a track Tr(n) in accordance with embodiment 4.

Referring to FIG. 15, the reduction in the amplitude V(n) of a signal reproduced from a normal pattern will be explained. In a case when a reverse pattern is not written in advance in the track Tr(n) as in embodiment 2, the amplitude V(n) increases gradually with an increase in the quantity of recording light as denoted by a solid line a3. In contrast, in a case when a reverse pattern is written in advance in the track Tr(n), the amplitudes are lower at low quantities of recording light due to the unerased parts of the reverse pattern as denoted by a dotted line a4 in FIG. 15. This indicates that a smaller quantity of recording light results in an correspondingly more and larger unerased parts, and the amplitude decreases by correspondingly larger amounts. Therefore, the method in accordance with the present embodiment is advantageous to a case where no reverse pattern is written in advance in the track Tr(n) in that the amplitude changes by large amounts and an optimum value are detectable with enhanced sensitivity.

Figure 16:
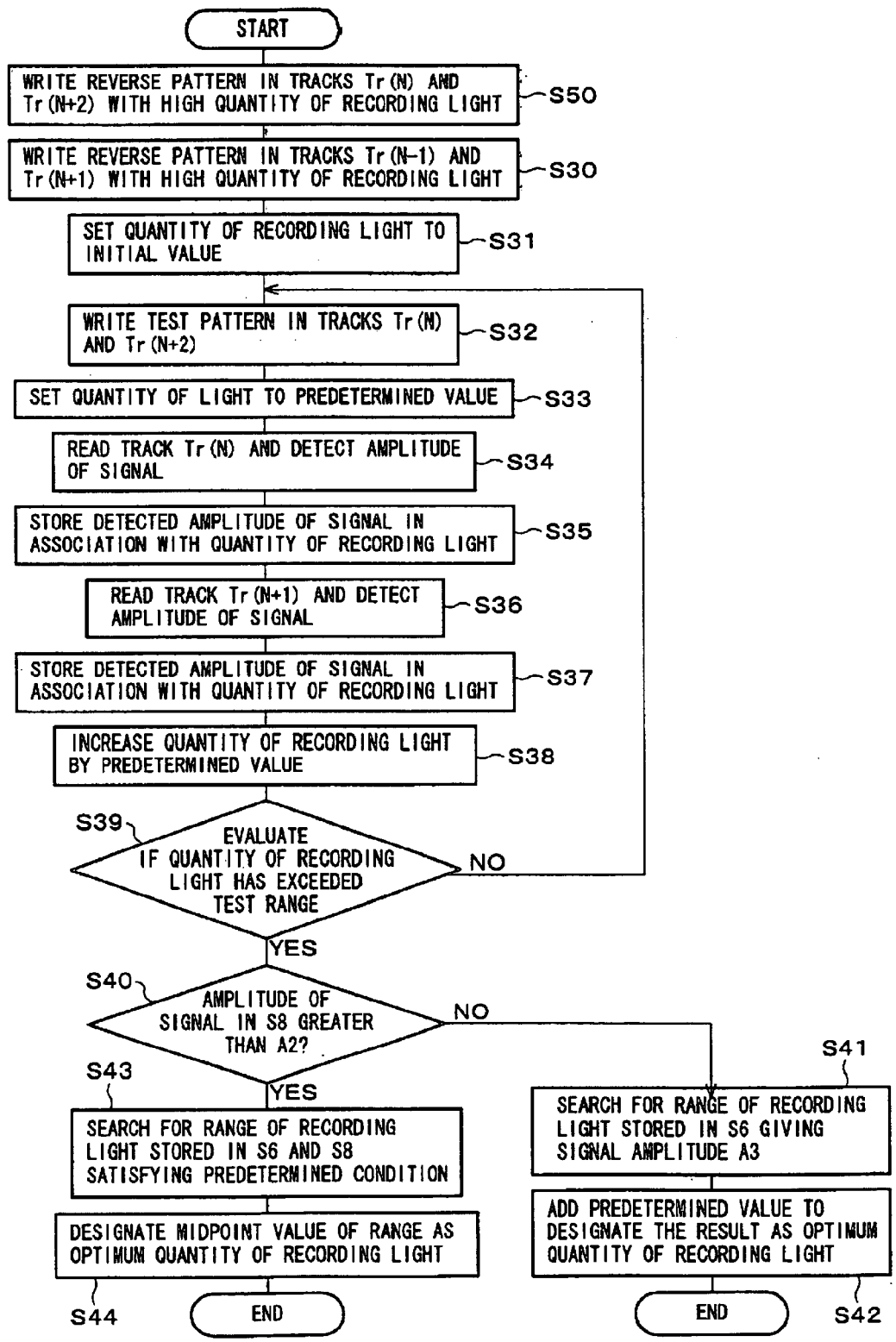
FIG. 16 is a flow chart showing a method to control a recording condition in accordance with embodiment 4.

The amplitude grows larger also if a reverse pattern is written only in the tracks Tr(n) and Tr(n+2) (not in the adjacent tracks Tr(n−1) and Tr(n+1)), using a relatively high quantity of recording light FIG. 16 is a flow chart showing operations to control recording conditions illustrated in FIG. 14(a) to FIG. 14(c).

First, a reverse pattern is written in advance in the tracks Tr(n) and Tr(n+2), using a relatively high quantity of recording light (Step 50). Subsequent operations are identical to those shown in the flow chart of FIG. 11 (embodiment 3). An optimum quantity of recording light is thus determined.

In the present embodiment described so far, test patterns (including erasing patterns) have been written in the tracks Tr(n−1) and Tr(n+2). This is beneficial to increase the amplitudes V(n) and V(n+1), but not essential.

Embodiment 5

Another embodiment of the present invention will be discussed in reference to FIG. 17. However, for convenience, the members of the present embodiment that are identical to those of the previous embodiments will not be explained in detail, or their description will be totally omitted. The present embodiment discloses a method whereby a maximum amplitude is obtained of a signal reproduced from a normal pattern of the track Tr(n) and of a signal reproduced from a reverse pattern of the adjacent track Tr(n+1), the changes in the amplitudes are normalized using the obtained maximum amplitudes as the reference (In the device shown in FIG. 9, the CPU46 performs normalization as normalize means), and those quantities of recording light that meet a predetermined condition are obtained based on an identical predetermined amplitude to determine an optimum quantity of recording light It is highly likely that the track Tr(n) and the adjacent track Tr(n+1) have different reproduction sensitivity and the amplitudes of signals reproduced from the individual tracks mentioned in embodiment 3 and 4 have different signal levels.

If recording marks are written in the track Tr(n) with an increasingly large quantity of recording light, the resultant recording marks grow wider and the amplitude V(n) converges at a moderate value. This indicates that the recording marks constituting a normal pattern have grown wider than the light spot used for reproduction. Meanwhile, the amplitude V(n+1) of a signal reproduced from the adjacent track Tr(n+1) is not affected by spillover effects of recording marks constituting a normal pattern, because the recording marks are narrow if a relatively small quantity of recording light is projected to the track Tr(n). Therefore, once the amplitude reaches a moderately large value, it no longer grows. This is also because the recording marks constituting a reverse pattern have grown wider than the light spot used for reproduction.

The maximum values of the amplitudes V(n) and V(n+1), although possessing different signal levels due to a difference in sensitivity, serve as an identical reference in the sense that these are both amplitudes of a signal reproduced from recording marks that are as wide as, or wider than, the light spot.

Therefore, if the changes in the amplitudes are normalized using the respective maximum amplitudes, an optimum quantity of recording light can be detected sharing a single predetermined amplitude as a sole reference.

Figure 17:
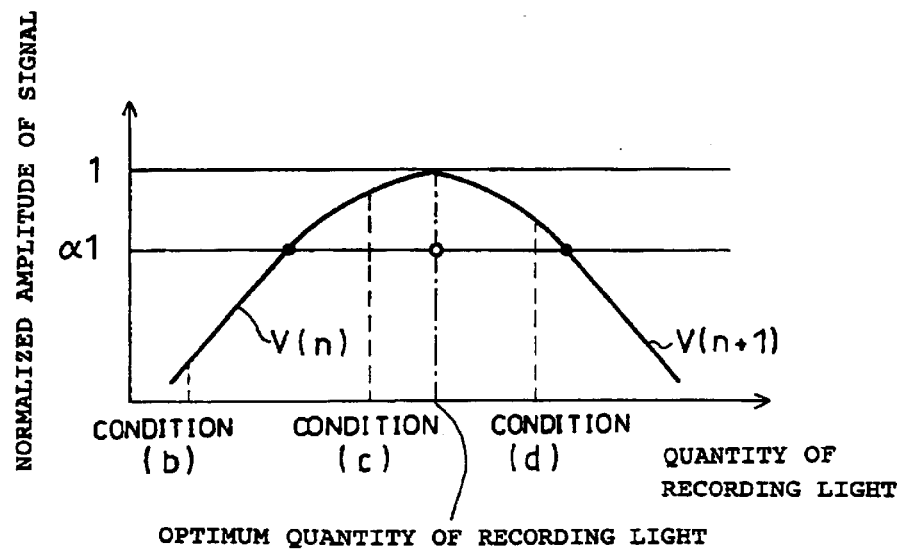
FIG. 17 is a graph showing the normalized amplitudes V(n) and V(n+1) of signals in accordance with embodiment 5.

For example, the maximum amplitude value is normalized to 1 as shown in FIG. 17. A recording condition is can be selected under which the amplitude V(n) of a signal reproduced from the track Tr(n) is equal to, or greater than $\alpha 1$ ($0<\alpha 1<1$) and the normalized of the amplitude V(n+1) of a signal reproduced from the adjacent track Tr(n+1) is equal to, or greater than, al ($0<\alpha 1<1$). To obtain a large margin for the quantity of recording light, the midpoint quantity of recording light in the range is desirably designated as an optimum recording condition.

Embodiment 6

Figure 18:
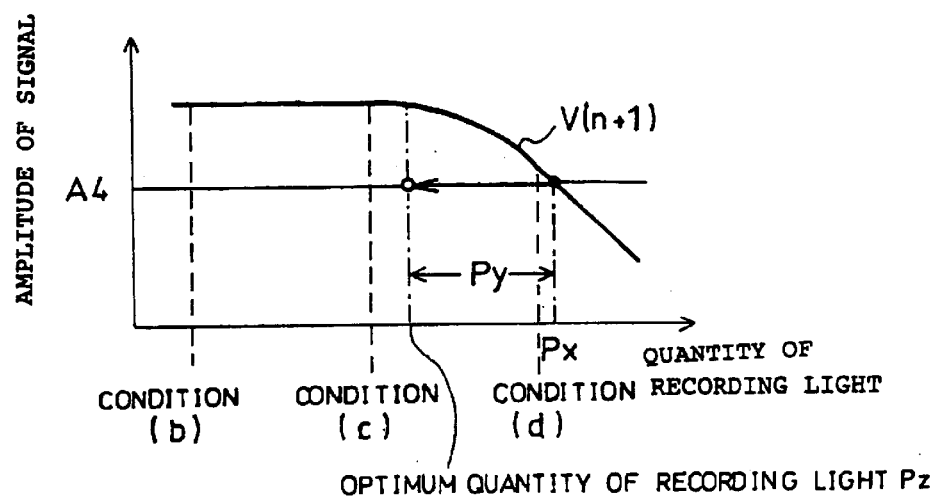
FIG. 18 is a graph showing the dependence of the amplitude V(n+1) of a signal on the quantity of recording light, illustrating a method to control a recording condition in accordance with embodiment 6.

Another embodiment of the present invention will be discussed in reference to FIG. 18. However, for convenience, the members of the present embodiment that are identical to those of the previous embodiments will not be explained in detail, or their description will be totally omitted.

The methods and devices in accordance with embodiments 3 and 4 were to detect both the amplitude of a signal reproduced from a normal pattern in the track Tr(n) and the amplitude of a signal reproduced from the reverse pattern in the adjacent track Tr(n+1). In the present embodiment, a method will be explained to determine recording conditions for the track Tr(n) through the detection of only the changes of the amplitude of a signal reproduced from the adjacent track Tr(n+1) to speed up the process.

Spillover effects from the marks that are written in the track Tr(n) to constitute a normal pattern can be estimated from the changes in the amplitude of a signal reproduced from the adjacent track Tr(n+1). Therefore, an optimum quantity of recording light Pz for the track Tr(n) can be determined which can write marks without producing spillover effects to the adjacent track Tr(n+1), by detecting the quantity of recording light (for example, the quantity of light at which the amplitude V(n+1) falls down to or below a predetermined value A4) at which spillover effects from the marks appear and performing a calculation on the detected quantity of recording light Px (substraction of a predetermined quantity of recording light Py (=Px−Py), multiplication by a predetermined multiplier, etc.)

According to this method, spillover effects from the pattern written in the track Tr(n) is measured through the reading of the adjacent track Tr(n+1), and a recording condition which produces no such effects is designated as the recording condition for the track Tr(n). As a result, recording conditions can be precisely obtained for the track Tr(n) even when recording sensitivity differs between the track Tr(n) and the track Tr(n+1).

Embodiment 7

Figure 19A:
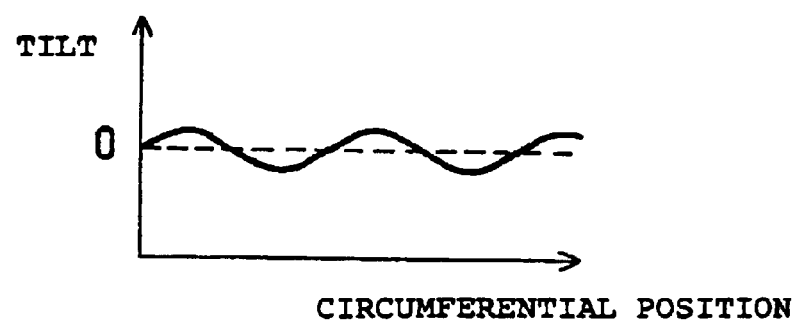
FIG. 19(*a*) and FIG. 19(*b*) are graphs showing circumferential variations in the tilt and the amplitude of a signal.
Figure 19B:
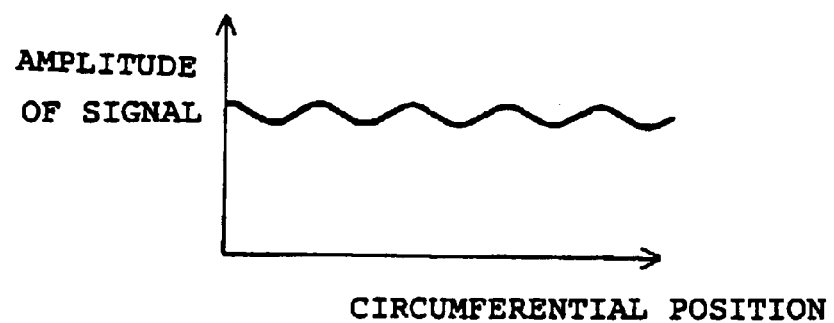

Another embodiment of the present invention will be discussed in reference to FIGS. 6 (*a*) to FIG. 6(*d*), FIG. 19(*a*), and FIG. 19(*b*). However, for convenience, the members of the present embodiment that are identical to those of the previous embodiments will not be explained in detail, or their description will be totally omitted. In the present embodiment, a method will be explained whereby the amplitude of a signal is detected for changes with further enhanced sensitivity while reducing adverse effects to the amplitude of a signal from circumferential variations of the track.

The amplitude of a signal is not always constant even in a single turn of the track due to various adverse effects including a tilt and a difference in sensitivity. For example, supposing that there is a tilt in single turn of the track as shown in FIG. 19(*a*), the amplitude of a signal varies even when it is reproduced from the marks written with an identical width in the track as shown in FIG. 19(*b*). The present embodiment addresses this problem. The following description will be based on the method to determine recording conditions in accordance with embodiment 3 (FIGS. 6(*a*) to 6(*d*)).

Here, a wide reverse pattern 21 is formed in advance in both the adjacent tracks Tr(n−1) and Tr(n+1) with a great light quantity of a recording light beam 20, and the amplitude of a signal reproduced from the adjacent track Tr(n+1) is detected and stored in association with a circumferential position (position in the track direction). Thereafter, a normal pattern is formed in the track Tr(n) with a predetermined quantity of recording light, followed by the detection of the amplitude of a signal reproduced from the track Tr(n) and the adjacent track Tr(n+1).

By detecting the amplitude of a signal reproduced from the adjacent track Tr(n+1) before a normal pattern is formed in the track Tr(n) in this manner, the amplitude of a signal reproduced form the normal pattern formed in the track Tr(n) and the adjacent track Tr(n+1) can be normalized in association with a circumferential position based on the amplitude (normalization to correct the differences of circumferential positions, effected by the CPU 46 in the case of the device shown in FIG. 9 as a single cycle variation normalization means). The normalization is effected every time a recording condition is changed. Thus, the adverse effects to the amplitude of a signal are reduced which occur due to a circumferential variation in a single cycle of the track, and sensitivity is enhanced in detecting changes in the amplitude of a signal.

The normalization can be effected, for example, based on a mean value of the amplitudes of a signal reproduced from the adjacent track Tr(n+1) for every area in which the quantity of recording light is specified. In other words, first, the amplitude of a signal reproduced from the adjacent track Tr(n+1) in which a reverse pattern 21 is written is obtained in advance in an area in which the quantity of recording light is specified, the and the means value of the amplitudes is obtained over the area in which the quantity of recording light is specified. The amplitudes of signals reproduced from the track Tr(n) and the adjacent track Tr(n+1) are normalized using the mean value after a normal pattern is written in the track Tr(n).

The present embodiment is intended to restrain variations in the amplitude that occur in the circumferential direction due to a tilt and some other factors. Even if the amplitude of a signal from the adjacent track Tr(n+1) before a normal pattern is formed in it is used to normalize the amplitude of a signal reproduced from the adjacent track Tr(n+1) as well as that of a signal reproduced from the track Tr(n) as described above, the amplitude varies due to a tilt and other factors only in the circumferential direction and does not vary between adjacent tracks (for example, between the land and the groove), which poses no problem.

The method in accordance with the present embodiment is applicable to embodiment 4 with slight modifications. The amplitude of a signal reproduced from a reverse pattern (the third test pattern) formed in the track Tr(n) may be used to normalize the amplitudes of signals Ad reproduced from the normal patterns formed in the track Tr(n) and the adjacent track Tr(n+1) under predetermined recording conditions. Alternatively, the amplitude of a signal reproduced from a reverse pattern (the third test pattern) formed in the track Tr(n) may be used to normalize the amplitude of a signal reproduced from the normal pattern formed in the track Tr(n), and then the amplitude of a signal reproduced from a reverse pattern formed in the adjacent track Tr(n+1) may be used to normalize the amplitude of a signal reproduced from the normal patterns formed in the adjacent track Tr(n+1).

The method in accordance with the present embodiment is applicable also to embodiment 5. In the event, two kinds of normalization are effected to restrain variations of the amplitude in the circumferential direction in accordance with the present embodiment and to correct differences in sensitivity between adjacent tracks.

The description so far has described some embodiments of the present invention; however, the present invention is not limited to such embodiments only and for example is applicable in optimization of the strength of a recording magnetic field. Further, although magnetic field modulation recording has been cited as an example, the present invention is also similarly applicable to optical modulation recording, in which event the amplitude of a signal can be used to detect changes in the width of recording marks and an optimum quantity of recording light can be obtained with high sensitivity.

Besides, recording conditions can be changed for every sector to obtain an optimum quantity of recording light.

Alternatively, a plurality of sets of recording conditions may be stipulated for a single sector to obtain an optimum quantity of recording light Throughout the embodiments discussed above, the amplitude was obtained either of the signal reproduced from the specified track Tr(n) (the second read-out signal) or the signal reproduced from the adjacent track. Tr(n+1) (the first read-out signal), before an optimum quantity of recording light was obtained based on the amplitude. The present invention is not limited to amplitude values. Those conditions under which the second read-out signal and the first read-out signal are in a predetermined state (for example, those conditions under which the second read-out signal and the first read-out signal have predetermined jitters or error rates) are obtained, before an optimum quantity of recording light was obtained based on the amplitude.

An optimum recording condition is obtainable, for example, by (i) writing the first and second test patterns as shown in FIGS. 6(a) to 6(d) and FIGS. 14(a) to 14(c) and designating as an optimum recording condition a condition under which the second read-out signal has a small jitter (or a small error rate) and the first read-out signal has a small jitter (or a small error rate); (ii) writing the first and second test patterns as shown in FIGS. 6(a) to 6(d) and FIGS. 14 (a) to 14(c), performing a predetermined calculation on a recording condition under which the second read-out signal has a desirable jitter value (for example, somewhere between 10% to 20%) or the error rate has a desirable value (for example, somewhere between $10^{-4}$ to $10^{-3}$), and designating as an optimum recording condition a condition under which larger recording marks can be formed than under those recording conditions; (iii) writing the first and second test patterns as shown in FIGS. 6(a) to 6(d) and FIGS. 14(a) to 14(c), performing a predetermined calculation on a recording condition under which the first read-out signal has a desirable jitter value (for example, somewhere between 10 % to 20%) or the error rate has a desirable value (for example, somewhere between $10^{-4}$ to $10^{-3}$), and designating as an optimum recording condition a condition under which larger recording marks can be formed than under those recording conditions. When the first and second test patterns are formed as shown in FIGS. 1(a) to 1(d), similarly, an optimum recording condition is obtainable a based on the jitter or error rate of either the second read-out signal or the first read-out signal, or both. Particularly, if optimum recording conditions are obtained based on the jitters and error rates of both the signal reproduced from the specified track (the second read-out signal) and the signal reproduced from the adjacent track (the first read-out signal), a sufficient reproduction signal is obtainable as a reproduction signal from the specified track, and optimum recording conditions which are free from cross-erase are obtainable from the signal reproduced from the adjacent track. Therefore, recording conditions can be obtained even when there is difference in recording sensitivity between adjacent tracks.

Further, throughout the foregoing embodiments, an optimum recording condition was obtained by the use of the amplitude of a read-out signal. Therefore, normalization was effected in embodiment 5 and in embodiment 7 in the circumferential direction, by the use of the amplitude value of a read-out signal. The present invention is not limited to this. Normalization can be effected by the use of a quantity detected from a read-out signal, such as the jitter and the error rate.

Further, although an external clock was produced from a sidewall between a land and a groove as a reference mark throughout the foregoing description, it can be reproduced from anything that is prerecorded on the optical recording medium to provide a reference mark.

Throughout the embodiments above, a push-pull signal was used to produce an external clock. Any other signal from which a reference mark is detectable may be used, including a tangential push-pull signal, an RF sum signal, etc.

In embodiments 1 and 2, an erasing pattern was used as the first test pattern. The present invention is not limited to this. In embodiments 3 to 7, a reverse pattern was used as the first test pattern, and a normal pattern as the second test pattern. The present invention is not limited to this. The first and second test patterns only need to be different from each other.

Throughout the embodiments, magneto-optical recording was being considered. The invention, however, is similarly applicable to other types of optical recording medium, such as one that utilizes on phase transition.

As described in detail in the foregoing, the optical recording method in accordance with a first invention is an optical recording method of recording information on an optical recording medium, including the steps of:

(a) recording a first test pattern in a first track on the optical recording medium under such a predetermined recording condition to form a wide recording mark;

(b) after the recording of the first test pattern, recording a second test pattern in an area, of a second track, which is adjacent to a recording area of the first test pattern under a plurality of recording conditions, the second track being adjacent to the first track;

(c) reading the first track to detect a first readout signal according to each of the plurality of recording conditions;

(d) reading the second track to detect a second read-out signal according to each of the plurality of recording conditions;

(e) determining an optimum recording condition for the second track from the plurality of recording conditions and the first and second read-out signals; and (f) recording information in the second track under the optimum recording condition.

As described in detail in the foregoing, the optical recording method in accordance with a second invention is an optical recording method of recording information on an optical recording medium, including the steps of:

(a) recording a first test pattern in a first track on the optical recording medium under such a predetermined recording condition to form a wide recording mark;

(b) after the recording of the first test pattern, recording a second test pattern in an area, of a second track, which is adjacent to a recording area of the first test pattern under a plurality of recording conditions, the second track being adjacent to the first track;

(c) reading the second track to detect a second read-out signal according to each of the plurality of recording conditions;

(d) obtaining a second recording condition under which the second read-out signal attains a predetermined state and performing a calculation on the second recording condition, so as to obtain a recording condition under which a wider recording mark is formed than under the second recording condition and designate this recording condition as an optimum recording condition; and (e) recording information in the second track under the optimum recording condition.

As described in detail in the foregoing, the optical recording method in accordance with a third invention is an optical recording method of recording information on an optical recording medium, including the steps of:

(a) recording a first test pattern in a first track on the optical recording medium under such a predetermined recording condition to form a wide recording mark;

(b) after the recording of the first test pattern, recording a second test pattern in an area, of a second track, which is adjacent to a recording area of the first test pattern under a plurality of recording conditions, the second track being adjacent to the first track;

(c) reading the first track to detect a first readout signal according to each of the plurality of recording conditions;

(d) obtaining a first recording condition under which the first read-out signal attains a predetermined state and performing a calculation on the first recording condition, so as to obtain a recording condition under which a narrower recording mark is formed than under the first recording condition and designate this recording condition as an optimum recording condition; and (e) recording information in the second track under the optimum recording condition.

As described in detail in the foregoing, the optical recording method in accordance with a fourth invention incorporates all the features of the optical recording method in accordance with the first invention and is such that:

if the first read-out signal does not attain a predetermined state, a second recording condition is obtained under which the second read-out signal attains a predetermined state, and a calculation is performed on the second recording condition, so as to obtain a recording condition under which a wider recording mark is formed than under the second recording condition and designate this recording condition as an optimum recording condition.

As described in detail in the foregoing, the optical recording device in accordance with a fifth invention is an optical recording device for recording information on an optical recording medium by at least projecting a light beam thereon, including:

recording means for recording a first test pattern in a first track on the optical recording medium under such a predetermined recording condition to form a wide recording mark in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the first track to detect a first read-out signal according to each of the plurality of recording conditions and also for reading the second track to detect a second read-out signal according to each of the plurality of recording conditions; and optimum recording condition determining means for determining an optimum recording condition for the second track from the plurality of recording conditions and the first and second read-out signals.

As described in detail in the foregoing, the optical recording device in accordance with a sixth invention is an optical recording device for recording information on an optical recording medium by at least projecting a light beam thereon, including:

recording means for recording a first test pattern in a first track on the optical recording medium under such a predetermined recording condition to form a wide recording mark in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the second track to detect a second read-out signal according to each of the plurality of recording conditions; and optimum recording condition determining means for obtaining a second recording condition under which the second read-out signal attains a predetermined state and performing a calculation on the second recording condition, so as to obtain a recording condition under which a wider recording mark is formed than under the second recording condition and designate this recording condition as an optimum recording condition.

As described in detail in the foregoing, the optical recording device in accordance with a seventh invention incorporates all the features of the optical recording device in accordance with the sixth invention, and is such that:

the optimum recording condition determining means obtains a recording condition under which an amplitude of the second read-out signal reaches a predetermined value as a second recording condition.

As described in detail in the foregoing, the optical recording device in accordance with an eighth invention is an optical recording device for recording information on an optical recording medium by at least projecting a light beam thereon, including:

recording means for recording a first test pattern in a first track on the optical recording medium under such a predetermined recording condition to form a wide recording mark in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the first track to detect a first read-out signal according to each of the plurality of recording conditions; and optimum recording condition determining means for obtaining a first recording condition under which the first read-out signal attains a predetermined state and performing a calculation on the first recording condition, so as to obtain a recording condition under which a narrower recording mark is formed than under the first recording condition and designate this recording condition as an optimum recording condition.

As described in detail so far, the optical recording device in accordance with a ninth invention incorporates all the features of the optical recording device in accordance with the eighth invention, and is such that:

the optimum recording condition determining means obtains a recording condition under which the amplitude of the first read-out signal reaches a predetermined value as a first recording condition.

As described in detail so far, the optical recording device in accordance with a tenth invention incorporates all the features of the optical recording device in accordance with any one of the fifth to ninth inventions, and further includes:

normalizing means for normalizing a quantity derived from the read-out signals by the read-out means, so as to correct a difference in sensitivity between individual tracks.

As described in detail so far, the optical recording device in accordance with an eleventh invention incorporates all the features of the optical recording device in accordance with any one of the seventh to ninth inventions, and further includes:

normalizing means for normalizing a signal quantity derived from the first or second read-out signal by the read-out means using a maximum value of an amplitude of the first or second read-out signal.

As described in detail so far, the optical recording device in accordance with a twelfth invention incorporates all the features of the optical recording device in accordance with any one of the fifth to eleventh inventions, and further includes:

circumferential variation normalizing means for normalizing at least either one of quantities derived from the first and second read-out signals, so as to correct a variation in a circumferential direction.

As described in detail so far, the optical recording device in accordance with the thirteenth invention incorporates all the features of the optical recording device in accordance with any one of the seventh, ninth, and eleventh inventions, and further includes:

circumferential variation normalizing means for causing the read-out means to read the first track and detect a circumferential variation normalization signal after the recording means has recorded the first test pattern and before the recording means records the second test pattern and for normalizing at least either one of amplitudes of the first and second read-out signals using an amplitude of the circumferential variation normalization signal.

As described in detail so far, the optical recording device in accordance with a fourteenth invention incorporates all the features of the optical recording device in accordance with any one of the seventh, ninth, and eleventh inventions, and further includes:

circumferential variation normalizing means for causing the recording means to record a third test pattern which is identical to the first test pattern in the second track before the recording means records the second test pattern, for causing the read-out means to read at least either one of the first and second tracks and to detect a circumferential variation normalization signal before the recording means records the second test pattern, and for normalizing at least either one of the amplitudes of the first and second read-out signals using an amplitude of the circumferential variation normalization signal.

As described in detail so far, the optical recording device in accordance with fifteenth invention incorporates all the features of the optical recording device in accordance with any one of the fifth to fourteenth inventions, and is such that:

the first and second test patterns are constituted by a combined pattern of marks and empty spaces, the marks and empty spaces being longer than 2T (T: channel bit length); and the optical recording device further includes:

displacement correction means for correcting recording positions of the first and second test patterns recorded by the recording means so that marks are aligned to marks or empty spaces along the direction perpendicular to the tracks.

As described in detail so far, the optical recording device in accordance with a sixteenth invention incorporates all the features of the optical recording device in accordance with the fifteenth invention, and is such that:

the recording means records a third test pattern in the second track before recording the second test pattern; and the displacement correction means corrects recording positions of the first and third test patterns so that marks are aligned to marks or empty spaces along the direction perpendicular to the tracks.

As described in detail so far, the optical recording device in accordance with seventeenth invention incorporates all the features of the optical recording device in accordance with any one of the fifth to sixteenth inventions, and is such that:

the first and second test patterns are constituted by a combined pattern of marks and empty spaces, the marks and empty spaces being longer than $(2+L) \cdot T$, where T is a channel bit length and L is a channel bit value required to prevent the recording means from being adversely affected by displacement of a recording bit when a recording condition is such that the second test pattern can be recorded.

As described in detail so far, the optical recording device in accordance with an eighteenth invention incorporates all the features of the optical recording device in accordance with any one of the fifth to seventeenth inventions, and is such that:

the first track is formed in either one of a l and or a groove; and the second track is formed in the other.

As detailed here, in an embodiment of the optical recording method and device in accordance with the present invention, an optimum recording condition for a specified track is determined through the recording of a test pattern in the specified track under a plurality of recording conditions, based on a signal reproduced from the specified track and a signal reproduced from an adjacent record track.

In this embodiment, recording is actually carried out in a specified track for which a recording condition is to be determined. A condition under which a sufficient reproduction signal is obtainable is determined based on a signal reproduced from the specified track. Also, a condition under which there occurs no cross-talk is determined based on a signal reproduced from an adjacent track. Thus, even if there exists a difference in recording sensitivity between adjacent tracks, a suitable recording condition is obtainable. As a result, cross-talk between tracks during signal reproduction and cross-erase during signal recording in the adjacent track are restrained to minimum levels, and recording density is improved.

In another embodiment of the optical recording method and device in accordance with the present invention, an optimum recording condition for a specified track is determined by recording a test pattern in the specified track under a plurality of recording conditions and performing a calculation on a recording condition under which a signal reproduced from the specified track attains a predetermined state.

In this embodiment, recording is actually carried out in a specified track for which a recording condition is to be determined. A condition under which a sufficient reproduction signal is obtainable is determined based on a signal reproduced from the specified track. Thus, even if there exists a difference in recording sensitivity between adjacent tracks, a suitable recording condition is obtainable. As a result, cross-talk between tracks during signal reproduction and cross-erase during signal recording in the adjacent track are restrained to minimum levels, and recording density is improved.

In a further embodiment of the optical recording method and device in accordance with the present invention, an optimum recording condition for a specified track is determined by recording a test pattern in the specified track under a plurality of recording conditions and performing a calculation on a recording condition under which a signal reproduced from an adjacent track attains a predetermined state.

In this embodiment, recording is actually carried out in a specified track for which a recording condition is to be determined. A condition under which a sufficient reproduction signal is obtainable is determined based on a signal reproduced from an adjacent track. Thus, even if there exists a difference in recording sensitivity between adjacent tracks, a suitable recording condition is obtainable. As a result, cross-talk between tracks during signal reproduction and cross-erase during signal recording in the adjacent track are restrained to minimum levels, and recording density is improved.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An optical recording method of recording information on an optical recording medium, comprising the steps of:
   (a) recording a first test pattern in a first track on the optical recording medium under such a predetermined recording condition to form a wider recording mark than the first track;
   (b) after the recording of the first test pattern, recording a second test pattern in an area, of a second track, which is adjacent to a recording area of the first test pattern under a plurality of recording conditions, the second track being adjacent to the first track;
   (c) reading the first track to detect a first read-out signal according to each of the plurality of recording conditions;
   (d) reading the second track to detect a second read-out signal according to each of the plurality of recording conditions;
   (e) determining an optimum recording condition for the second track from the plurality of recording conditions and the first and second read-out signals; and
   (f) recording information in the second track under the optimum recording condition.

2. The optical recording method as defined in claim 1, wherein:
   an amplitude of the first read-out signal is detected in step (c);
   an amplitude of the second read-out signal is detected in step (d); and
   the optimum recording condition is determined in step (e) based on the plurality of recording conditions and the amplitudes of the first and second read-out signals.

3. The optical recording method as defined in claim 1, wherein:

a jitter of the first read-out signal detected in step (c);

a jitter of the second read-out signal detected in step (d); and the optimum recording condition is determined in step (e) based on the plurality of recording conditions and the jitters of the first and second read-out signals.

4. The optical recording method as defined in claim 1, wherein:

an error rate of the first read-out signal detected in step (c);

an error rate of the second read-out signal detected in step (d); and the optimum recording condition is determined in step (e) based on the plurality of recording conditions and the error rates of the first and second read-out signals.

5. The optical recording method as defined in claim 1, wherein:

if the first read-out signal does not attain a predetermined state in step (e), a second recording condition is obtained under which the second read-out signal attains a predetermined state, and a calculation is performed on the second recording condition, so as to obtain a recording condition under which a wider recording mark is formed than under the second recording condition and designate this recording condition as an optimum recording condition.

6. The optical recording method as defined in claim 1, wherein:

it is evaluated in step (e) whether an amplitude of the first readout out signal has reached a predetermined threshold value;

if the amplitude of the first read-out signal has reached the threshold value, an optimum recording condition is determined based on the plurality of recording conditions and the amplitudes of the first and second read-out signals; and if the amplitude of the first read-out signal has not reached the threshold value, a second recording condition is obtained under which an amplitude of the second read-out signal reaches a predetermined value, and a calculation is performed on the second recording condition, so as to obtain a recording condition under which a wider recording mark is formed than under the second recording condition and designate this recording condition as an optimum recording condition.

7. An optical recording device for recording information on an optical recording medium by at least projecting a light beam thereon, comprising:

recording means for recording a first test pattern in a first track on the optical recording medium under such a predetermined recording condition to form a wider recording mark than the first track in determining a recording condition for a second track and also for recording, after the recording of the first test pattern, a second test pattern in an area, of a second track, which is adjacent to a recording area of the first test pattern under a plurality of recording conditions, the second track being adjacent to the first track;

read-out means for reading the first track to detect a first read-out signal according to each of the plurality of recording conditions and also for reading the second track to detect a second read-out signal according to each of the plurality of recording conditions; and optimum recording condition determining means for determining an optimum recording condition for the second track from the plurality of recording conditions and the first and second read-out signals.

8. The optical recording device as defined in claim 7, wherein:

the second test pattern recorded by the recording means is constituted by a reverse pattern of the first test pattern.

9. The optical recording device as defined in claim 7, wherein:

the first track is formed in either one of a land or a groove; and the second track is formed in the other.

10. The optical recording device as defined in claim 7, wherein:

the read-out means detects amplitudes of the first and second readout signals; and the optimum recording condition determining means determines the optimum recording condition based on the plurality of recording conditions and the amplitudes of the first and second read-out signals.

11. The optical recording device as defined in claim 7, wherein:

the read-out means detects jitters of the first and second read-out signals; and the optimum recording condition determining means determines the optimum recording condition based on the plurality of recording conditions and the jitters of the first and second read-out signals.

12. The optical recording device as defined in claim 7, wherein:

the read-out means detects error rates of the first and second read-out signals; and the optimum recording condition determining means determines the optimum recording condition based on the plurality of recording conditions and the error rates of the first and second read-out signals.

* * * * *